(12) United States Patent
Tamura et al.

(10) Patent No.: US 11,333,479 B2
(45) Date of Patent: May 17, 2022

(54) THREE-DIMENSIONAL MEASURING SYSTEM, AND THREE-DIMENSIONAL MEASURING METHOD

(71) Applicant: Tokyo Seimitsu Co., Ltd., Tokyo (JP)

(72) Inventors: Hitoshi Tamura, Tsuchiura (JP); Tomotaka Yamagata, Tsuchiura (JP); Kento Kurihara, Tsuchiura (JP); Yoichi Togawa, Tsuchiura (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

(21) Appl. No.: 17/336,541

(22) Filed: Jun. 2, 2021

(65) Prior Publication Data

US 2021/0293519 A1 Sep. 23, 2021

Related U.S. Application Data

(63) Continuation of application No. PCT/JP2020/010912, filed on Mar. 12, 2020.

(30) Foreign Application Priority Data

Mar. 14, 2019 (JP) .............................. JP2019-047103
Mar. 4, 2020 (JP) .............................. JP2020-037113
(Continued)

(51) Int. Cl.
*G06F 17/00* (2019.01)
*G01B 5/00* (2006.01)
(Continued)

(52) U.S. Cl.
CPC .......... *G01B 5/0004* (2013.01); *B25J 13/088* (2013.01); *B25J 18/00* (2013.01); *B25J 19/0091* (2013.01);
(Continued)

(58) Field of Classification Search
CPC .... G01B 5/0004; G01B 5/0014; G01B 5/008; B25J 18/00; B25J 19/02; B25J 19/0091; B25J 13/088
(Continued)

(56) References Cited

U.S. PATENT DOCUMENTS 4,484,293 A * 11/1984 Minucciani ............ G01B 21/04
318/568.1
4,755,952 A * 7/1988 Johns ..................... G05B 19/18
356/388
(Continued)

FOREIGN PATENT DOCUMENTS

JP 4-324301 A 11/1992
JP 11-190617 A 7/1999
(Continued)

OTHER PUBLICATIONS

Decision of Dismissal of Amendment in JP 2020-079380 dated Jul. 10, 2020.
(Continued)

*Primary Examiner* — Ronnie M Mancho
(74) *Attorney, Agent, or Firm* — Birch, Stewart, Kolasch & Birch, LLP

(57) ABSTRACT

The three-dimensional measuring method includes: a conveying step of conveying a workpiece to be measured by a robot arm configured to change an attitude of the workpiece; a measuring step of performing three-dimensional measurement on the workpiece by a probe configured to be movable relative to the surface plate in a state in which the workpiece is held by the robot arm; a relative-position change detecting step of detecting a change in a relative position between the surface plate and the robot arm; and a vibration correcting step of correcting a result of the measurement performed on the workpiece in the measuring step based on a result of
(Continued)

detection performed in the relative-position change detecting step.

44 Claims, 25 Drawing Sheets

(30) Foreign Application Priority Data

Mar. 4, 2020 (JP) .............................. JP2020-037114
Mar. 4, 2020 (JP) .............................. JP2020-037115

(51) Int. Cl.
*B25J 13/08* (2006.01)
*B25J 18/00* (2006.01)
*B25J 19/00* (2006.01)
*B25J 19/02* (2006.01)
*G01B 5/008* (2006.01)

(52) U.S. Cl.
CPC .............. *B25J 19/02* (2013.01); *G01B 5/008* (2013.01); *G01B 5/0014* (2013.01)

(58) Field of Classification Search
USPC .......................................................... 33/503
See application file for complete search history.

(56) References Cited

U.S. PATENT DOCUMENTS

| | | | | |
|---|---|---|---|---|
| 4,799,170 A | * | 1/1989 | Nakaya .................. | G01B 7/008 33/504 |
| 4,833,624 A | * | 5/1989 | Kuwahara .......... | G05B 19/4148 318/568.2 |
| 4,895,454 A | | 1/1990 | Kammleiter et al. | |
| 4,979,093 A | * | 12/1990 | Laine ...................... | B23Q 1/25 700/61 |
| 5,002,448 A | * | 3/1991 | Kamijima ............... | B23P 19/04 29/739 |
| 5,161,936 A | * | 11/1992 | Kato ...................... | B25J 9/0084 414/728 |
| 5,198,990 A | * | 3/1993 | Farzan ................... | G01B 21/04 700/195 |
| 5,808,888 A | * | 9/1998 | Susnjara ............... | G05B 19/423 700/195 |
| 2008/0235971 A1 | | 10/2008 | Sakai et al. | |
| 2017/0326739 A1 | | 11/2017 | Nakazato et al. | |
| 2019/0168378 A1 | | 6/2019 | Ishikawa et al. | |

FOREIGN PATENT DOCUMENTS

| | | |
|---|---|---|
| JP | 2008-249352 A | 10/2008 |
| JP | 2008-309671 A | 12/2008 |
| JP | 2016-109630 A | 6/2016 |
| JP | 2019-100904 A | 6/2019 |

OTHER PUBLICATIONS

Decision of Refusal in JP 2020-079380 dated Jul. 10, 2020.
Decision to Grant a Patent in JP 2020-037113 dated May 26, 2020.
International Preliminary Report on Patentability for PCT/JP2020/010912 (PCT/IPEA/409) dated Jan. 7, 2021.
International Search Report for PCT/JP2020/010912 dated Apr. 7, 2020.
Notice of Reasons for Refusal in JP 2019-047103 dated Dec. 3, 2019.
Notice of Reasons for Refusal in JP 2020-037113 dated Mar. 31, 2020.
Notice of Reasons for Refusal in JP 2020-079380 dated May 26, 2020.
Written Opinion of the International Searching Authority for PCT/JP2020/010912 (PCT/ISA/237) dated Apr. 7, 2020.
Great Britain Office Action for Britain Application No. 2112849.1, dated Nov. 22, 2021.

* cited by examiner

FIG. 21
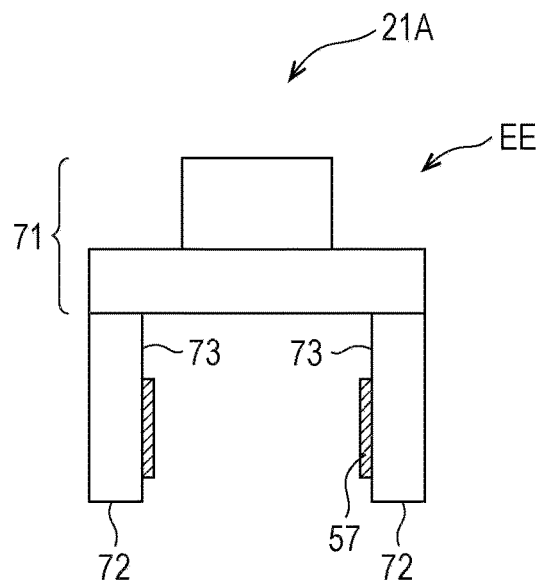
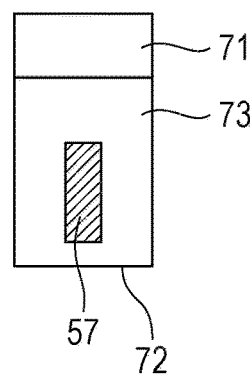
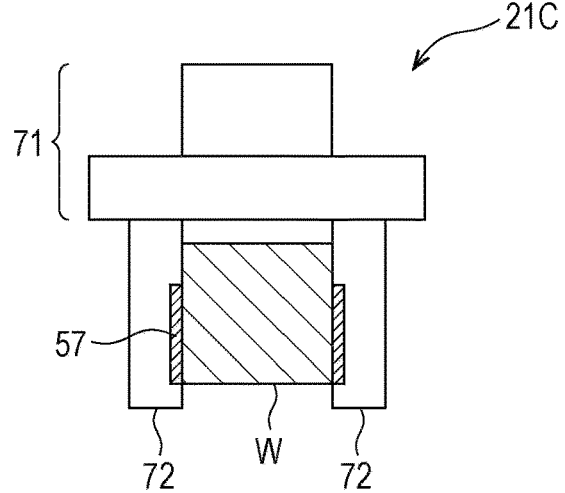

FIG. 22
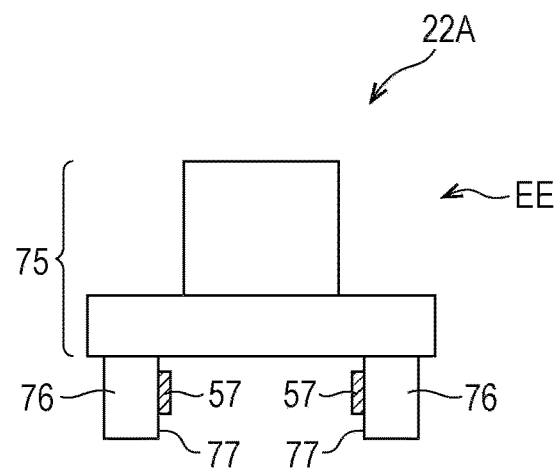
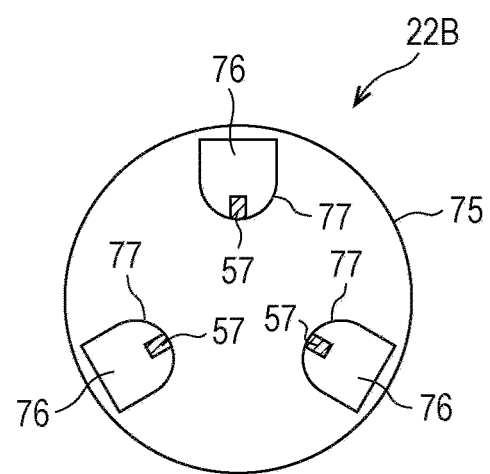
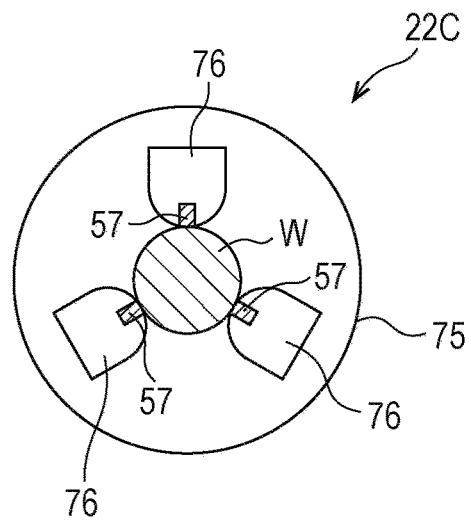

THREE-DIMENSIONAL MEASURING SYSTEM, AND THREE-DIMENSIONAL MEASURING METHOD

CROSS-REFERENCE TO RELATED APPLICATIONS

The present application is a Continuation of PCT International Application No. PCT/JP2020/010912 filed on Mar. 12, 2020 claiming priorities under 35 U.S.C. § 119(a) to Japanese Patent Application No. 2019-047103 filed on Mar. 14, 2019, and Japanese Patent Applications Nos. 2020-037113, 2020-037114 and 2020-037115 filed on Mar. 4, 2020. Each of the above applications is hereby expressly incorporated by reference, in their entirety, into the present application.

BACKGROUND OF THE INVENTION

1. Field of the Invention

The presently disclosed subject matter relates to three-dimensional measuring systems and three-dimensional measuring methods, and particularly relates to a three-dimensional measuring system and a three-dimensional measuring method using a three-dimensional measuring machine and a robot arm.

2. Description of the Related Art

Heretofore, various techniques associated with installation of a workpiece that is a target of measurement performed by the three-dimensional measuring machine when the workpiece is measured have been proposed.

For example, PTL 1 proposes a measuring jig used when a workpiece is mounted on a surface plate. According to a measuring jig disclosed in PTL 1, blocks can be appropriately disposed on a plate pallet, and the blocks can fix the workpiece of a three-dimensional shape. A plurality of pallets each having a workpiece fixed thereon in advance are prepared, so that each of the workpieces is automatically set on a surface plate by exchanging the pallets from one to another.

PTL 1: Japanese Patent Application Laid-Open No. 04-324301

SUMMARY OF THE INVENTION

Here, it is not necessarily the case that a workpiece to be measured is disposed in only one attitude, but the workpiece may be disposed in a plurality of attitudes. When a single workpiece is measured in a plurality of attitudes as described above, measuring jigs suitable for the attitudes of the workpiece are required for individual attitudes. Accordingly, the number of processes of design and cost of the measuring jigs are increased. Furthermore, the workpiece is required to be mounted on the measuring jigs for individual attitudes of the measurement, and therefore, a long period of time is required for preparation of the measurement.

Even in the case where the measuring jig disclosed in PTL 1 is used, when the single workpiece is measured in a plurality of attitudes, different palettes are to be generated for different attitudes of the workpiece and the workpiece is required to be mounted on the different measuring jigs in different measuring attitudes.

Accordingly, there arises a problem in that measuring efficiency of the general techniques is low since a workpiece is mounted by a person. Furthermore, in addition to improvement of the measuring efficiency, improvement of measuring accuracy is also one of important technical issues for the three-dimensional measuring machines.

The presently disclosed subject matter has been made in view of the circumstances, and an object of the presently disclosed subject matter is to provide a three-dimensional measuring system and a three-dimensional measuring method that improve measuring accuracy and measuring efficiency.

To attain the object described above, a three-dimensional measuring system according to a first aspect of the presently disclosed subject matter includes a surface plate, an end effector configured to hold a workpiece to be measured, a robot arm configured to change an attitude of the workpiece, and a probe configured to be movable relative to the surface plate. Since the robot arm configured to change an attitude of the workpiece is provided, the attitude of the workpiece can be easily changed when three-dimensional measurement is performed using the probe configured to be movable relative to the surface plate. Accordingly, efficiency of the three-dimensional measurement can be improved. Furthermore, since the attitude of the workpiece is changed by means of the robot arm, variation of a measuring position is reduced and measuring accuracy can be improved.

In the three-dimensional measuring system according to the first aspect, the probe preferably performs the three-dimensional measurement on the workpiece in a state in which the workpiece is held by the robot arm. Since the probe performs the three-dimensional measurement on the workpiece in the state in which the workpiece is held by the end effector of the robot arm, the attitude of the workpiece can be easily changed. Accordingly, the efficiency of the three-dimensional measurement can be further improved.

The three-dimensional measuring system according to the first aspect preferably includes relative-position change detecting means for detecting a change in a relative position between the surface plate and the robot arm and correcting means for correcting a result of the measurement performed on the workpiece by the probe based on a result of the detection performed by the relative-position change detecting means.

Examples of an outside environment (a measuring environment) that affects the accuracy of the three-dimensional measurement include a change in a relative position between the surface plate and the robot arm. Since the relative-position change detecting means can detect a change in a relative position between the surface plate and the robot arm and the correcting means can correct a result of the measurement performed on the workpiece by the probe based on a result of the detection, the accuracy of the three-dimensional measurement performed on the workpiece can be further improved.

In the three-dimensional measuring system according to the first aspect, the relative-position change detecting means preferably includes arm vibration detecting means for detecting vibration of the robot arm. By this, influence of the vibration of the robot arm can be reduced and the accuracy of the three-dimensional measurement can be further improved.

In the three-dimensional measuring system according to the first aspect, the relative-position change detecting means preferably includes surface-plate vibration detecting means for detecting vibration of the surface plate and/or inclination detecting means for detecting an inclination of the surface plate relative to a horizontal direction. By this, influence of the vibration and/or an inclination of the surface plate can be reduced and the accuracy of the three-dimensional measurement can be further improved.

In the three-dimensional measuring system according to the first aspect, the relative-position change detecting means preferably detects change amounts of a relative position in a horizontal direction and a vertical direction, and the correcting means preferably adds the change amounts of the relative position to or subtracts the change amounts of the relative position from a result of the measurement performed on the workpiece by the probe in the horizontal direction and the vertical direction.

In the three-dimensional measuring system according to the first aspect, the relative-position change detecting means preferably detects a change in the relative position in real time, and the correcting means preferably corrects a result of the measurement performed on the workpiece by the probe in real time based on the change in the relative position detected in real time.

In the three-dimensional measuring system according to the first aspect, the relative-position change detecting means preferably includes a laser tracker including a reflector and a laser tracker body configured to emit laser light to the reflector and receive reflected light of the laser light from the reflector so as to obtain a displacement of the reflector.

The reflector is preferably disposed on the robot arm. Disposing the reflector on the robot arm enables vibration of the robot arm itself that affects the workpiece W to be more accurately detected.

The three-dimensional measuring system according to the first aspect preferably includes temperature detecting means for detecting a temperature of the workpiece, and correcting means for correcting a result of the measurement performed on the workpiece by the probe based on a result of the detection performed by the temperature detecting means.

The examples of the outside environment (the measuring environment) that affects the accuracy of the three-dimensional measurement include a temperature of the workpiece. Since the temperature detecting means can detect a temperature of the workpiece and the correcting means can correct a result of the three-dimensional measurement based on the temperature of the workpiece, influence of the temperature of the workpiece can be reduced, the accuracy of the three-dimensional measurement can be further improved.

In the three-dimensional measuring system according to the first aspect, the end effector of the robot arm preferably includes temperature detecting means for detecting a temperature of the workpiece. The temperature detecting means is more preferably disposed on a holding surface of the end effector that holds the workpiece. Consequently, a temperature of the workpiece held by the end effector can be detected with high accuracy. Furthermore, since the end effector includes the temperature detecting means, temperature detection can be automatically started when the robot arm holds the workpiece. Accordingly, efficiency of the three-dimensional measurement can be improved. The three-dimensional measuring system according to the first aspect more preferably includes correcting means for correcting a result of the measurement performed on the workpiece by the probe based on a result of the detection performed by the temperature detecting means. Since the result of the three-dimensional measurement can be corrected based on the temperature of the workpiece, influence of the temperature of the workpiece can be reduced and the accuracy of the three-dimensional measurement can be further improved.

In the three-dimensional measuring system according to the first aspect, the temperature detecting means detects a temperature of the workpiece in a state in which the workpiece is held by the robot arm. Since the temperature can be detected in the state in which the workpiece is not mounted on the surface plate but is held by the robot arm, the workpiece can be quickly conveyed without being mounted on the surface plate once when the workpiece does not satisfy a predetermined temperature condition, for example. Accordingly, an operation rate of the three-dimensional measuring system can be improved.

In the three-dimensional measuring system according to the first aspect, the temperature detecting means preferably starts detection of a temperature of the workpiece when the workpiece is held by the robot arm. Although the temperature detection is performed after the workpiece is mounted on the surface plate according to the general techniques, the temperature detection can be started at a timing earlier than that of the general techniques in the three-dimensional measuring system according to the first aspect. This is considerably advantageous when a comparatively long period of time is required for activation of the temperature detecting means.

In the three-dimensional measuring system according to the first aspect, a robot base that supports the robot arm may be disposed outside the surface plate. Since the robot base is disposed outside the surface plate, a comparatively large robot arm can be used.

In the three-dimensional measuring system according to the first aspect, the robot base that supports the robot arm may be disposed on the surface plate. Since the robot base is disposed on the surface plate, a vibration system of the robot arm is the same as that of the surface plate. Accordingly, influence of the vibration of the outside environment can be reduced and the accuracy of the three-dimensional measurement can be further improved.

In the three-dimensional measuring system according to the first aspect, the robot arm preferably includes an abutting portion that directly or indirectly abuts on the surface plate when the probe measures the workpiece. Since the abutting portion of the robot arm is directly or indirectly abuts on the surface plate, vibration of the robot arm itself can be reduced, and accordingly, the accuracy of the three-dimensional measurement can be further improved.

In the three-dimensional measuring system according to the first aspect, a damping member is disposed on the surface plate, and the abutting portion of the robot arm indirectly abuts on the surface plate through the damping member. Since the abutting portion of the robot arm indirectly abuts on the surface plate, a degree of freedom of an attitude of the robot arm at a time of measurement can be improved. Furthermore, since a gap in a vertical direction (a Z direction) can be ensured between the robot arm and the surface plate, measurement can be performed while a workpiece having a comparatively long length in the vertical direction is held so as not to be in contact with the surface plate.

In the three-dimensional measuring system according to the first aspect, the robot arm includes a plurality of arms and a plurality of joint portions coupling the plurality of arms in a rotatable manner, and the abutting portion of the robot arm is one of the plurality of joint portions. The abutting portion of the robot arm is more preferably one of the plurality of joint portions that is closest to the end effector.

Furthermore, to attain the object described above, a three-dimensional measuring method according to a second aspect of the presently disclosed subject matter includes a conveying step of conveying a workpiece to be measured by a robot arm configured to change an attitude of the workpiece and a measuring step of performing three-dimensional measurement on the workpiece by a probe configured to be movable relative to the surface plate. Even in the three-dimensional measuring method according to the second aspect, effects the same as those of the three-dimensional measuring system according to the first aspect can be obtained.

In the three-dimensional measuring method according to the second aspect, the probe preferably performs the three-dimensional measurement on the workpiece in a state in which the workpiece is held by the robot arm in the measuring step. Since the probe performs the three-dimensional measurement on the workpiece in the state in which the workpiece is held by the end effector of the robot arm, an attitude of the workpiece can be easily changed. Accordingly, efficiency of the three-dimensional measurement can be further improved.

The three-dimensional measuring method according to the second aspect preferably includes a relative-position change detecting step of detecting a change in a relative position between the surface plate and the robot arm, and a vibration correcting step of correcting a result of the measurement performed on the workpiece in the measuring step based on a result of the detection performed in the relative-position change detecting step.

Examples of an outside environment (a measuring environment) that affects the accuracy of the three-dimensional measurement include a change in a relative position between the surface plate and the robot arm. Since a change in a relative position between the surface plate and the robot arm can be detected in the relative-position change detecting step and a result of the measurement performed on the workpiece by the probe can be corrected in the vibration correcting step based on a result of the detection, accuracy of the three-dimensional measurement performed on the workpiece can be further improved.

In the three-dimensional measuring method according to the second aspect of the presently disclosed subject matter, the relative-position change detecting step includes a step of detecting vibration of the robot arm. Furthermore, the relative-position change detecting step preferably includes a step of detecting vibration of the surface plate. Moreover, the relative-position change detecting step preferably includes a step of detecting an inclination of the surface plate.

In the three-dimensional measuring method according to the second aspect of the presently disclosed subject matter, the relative-position change detecting step preferably includes a step of detecting change amounts of the relative position in a horizontal direction and a vertical direction, and the vibration correcting step preferably includes a step of adding the change amounts of the relative position to or subtracting the change amounts of the relative position from a result of the measurement performed on the workpiece by the probe in the horizontal direction and the vertical direction.

In the three-dimensional measuring method according to the second aspect of the presently disclosed subject matter, the relative-position change detecting step preferably detects the change in the relative position in real time, and the vibration correcting step preferably corrects a result of the measurement performed on the workpiece by the probe in real time based on the change in the relative position detected in real time.

The three-dimensional measuring method according to the second aspect of the presently disclosed subject matter preferably includes a temperature detecting step of detecting a temperature of the workpiece and a temperature correcting step of correcting a result of the measurement performed on the workpiece in the measuring step based on a result of the detection performed in the temperature detecting step.

The examples of the outside environment (the measuring environment) that affects the accuracy of the three-dimensional measurement further include a temperature of the workpiece. Since the temperature of the workpiece can be detected in the temperature detecting step and a result of the three-dimensional measurement can be corrected based on the temperature of the workpiece in the temperature correcting step, influence of the temperature of the workpiece can be reduced and accuracy of the three-dimensional measurement can be further improved.

Furthermore, the three-dimensional measuring method according to the second aspect of the presently disclosed subject matter preferably includes a temperature detecting step of detecting a temperature of the workpiece by temperature detecting means disposed on the end effector of the robot arm. Accordingly, a temperature of the workpiece held by the end effector can be detected with high accuracy. Furthermore, since the end effector includes the temperature detecting means, temperature detection can be automatically started when the robot arm holds the workpiece. Accordingly, efficiency of the three-dimensional measurement can be improved.

Furthermore, the three-dimensional measuring method according to the second aspect of the presently disclosed subject matter preferably includes a temperature correcting step of correcting a result of the measurement performed on the workpiece in the measuring step based on a result of the detection performed in the temperature detecting step.

The temperature detecting step is preferably performed in the conveying step. The efficiency of the three-dimensional measurement can be further improved by performing the detection of the temperature of the workpiece in the conveying step.

In the three-dimensional measuring method according to the second embodiment, the temperature detecting step is preferably performed in a state in which the workpiece is held by the robot arm. Since the temperature can be detected by the temperature detecting means in the state in which the workpiece is not mounted on the surface plate but is held by the robot arm, efficiency of the three-dimensional measurement can be improved.

In the three-dimensional measuring method according to the second aspect, the temperature detecting step is preferably started when the workpiece is held by the robot arm. Although the temperature detection is performed after the workpiece is mounted on the surface plate by the robot arm according to the general techniques, the temperature detection can be started at a timing earlier than that of the general techniques in the three-dimensional measuring method according to the second aspect.

The three-dimensional measuring method according to the second aspect preferably includes a temperature determining step of determining whether a temperature of the workpiece satisfies a predetermined temperature condition. By this, a determination as to whether a temperature of the workpiece satisfies a temperature condition suitable for the three-dimensional measurement can be made, for example.

Here, the temperature determining step is preferably performed in a state in which the workpiece is held by the robot arm. Here, more preferably, when it is determined that the predetermined temperature condition is not satisfied in the temperature determining step, the workpiece is conveyed in a state in which the workpiece is held by the robot arm. When it is determined that the workpiece does not satisfy the predetermined temperature condition, for example, the workpiece can be quickly conveyed without being mounted on the surface plate once. Accordingly, efficiency of the three-dimensional measurement can be further improved.

Here, more preferably, the temperature detecting step is performed in real time in the state in which the workpiece is held by the robot arm, and a result of the measurement performed on the workpiece in the measuring step is corrected in real time based on a result of the detection performed in the temperature detecting step. Since the temperature detection, the three-dimensional measurement, and the correction of a measuring result can be performed in the state in which the workpiece is held by the robot arm, a time lag (a time difference) between the temperature detection and the correction of the measuring result can be reduced.

In the three-dimensional measuring method according to the second aspect, a robot base that supports the robot arm is preferably disposed outside the surface plate. Alternatively, the robot base that supports the robot arm is preferably disposed on the surface plate.

The three-dimensional measuring method according to the second aspect preferably includes a mounting step of causing an abutting portion of the robot arm to directly or indirectly abut on the surface plate in the state in which the workpiece is held by the robot arm. Furthermore, preferably, a damping member is disposed on the surface plate, and in the mounting step, the abutting portion of the robot arm indirectly abuts on the surface plate through the damping member.

In the three-dimensional measuring method according to the second aspect, the robot arm preferably includes a plurality of arms and a plurality of joint portions coupling the plurality of arms in a rotatable manner, and the abutting portion of the robot arm is preferably one of the plurality of joint portions. The abutting portion of the robot arm is more preferably one of the plurality of joint portions that is closest to the end effector.

According to the presently disclosed subject matter, a three-dimensional measuring system and a three-dimensional measuring method that improve measuring accuracy and measuring efficiency can be provided.

BRIEF DESCRIPTION OF THE DRAWINGS

FIG. 21 is a diagram illustrating an example of an end effector including temperature detecting means;

FIG. 22 is a diagram illustrating an example of the end effector including temperature detecting means;

DESCRIPTION OF THE PREFERRED EMBODIMENTS

Figure 1:
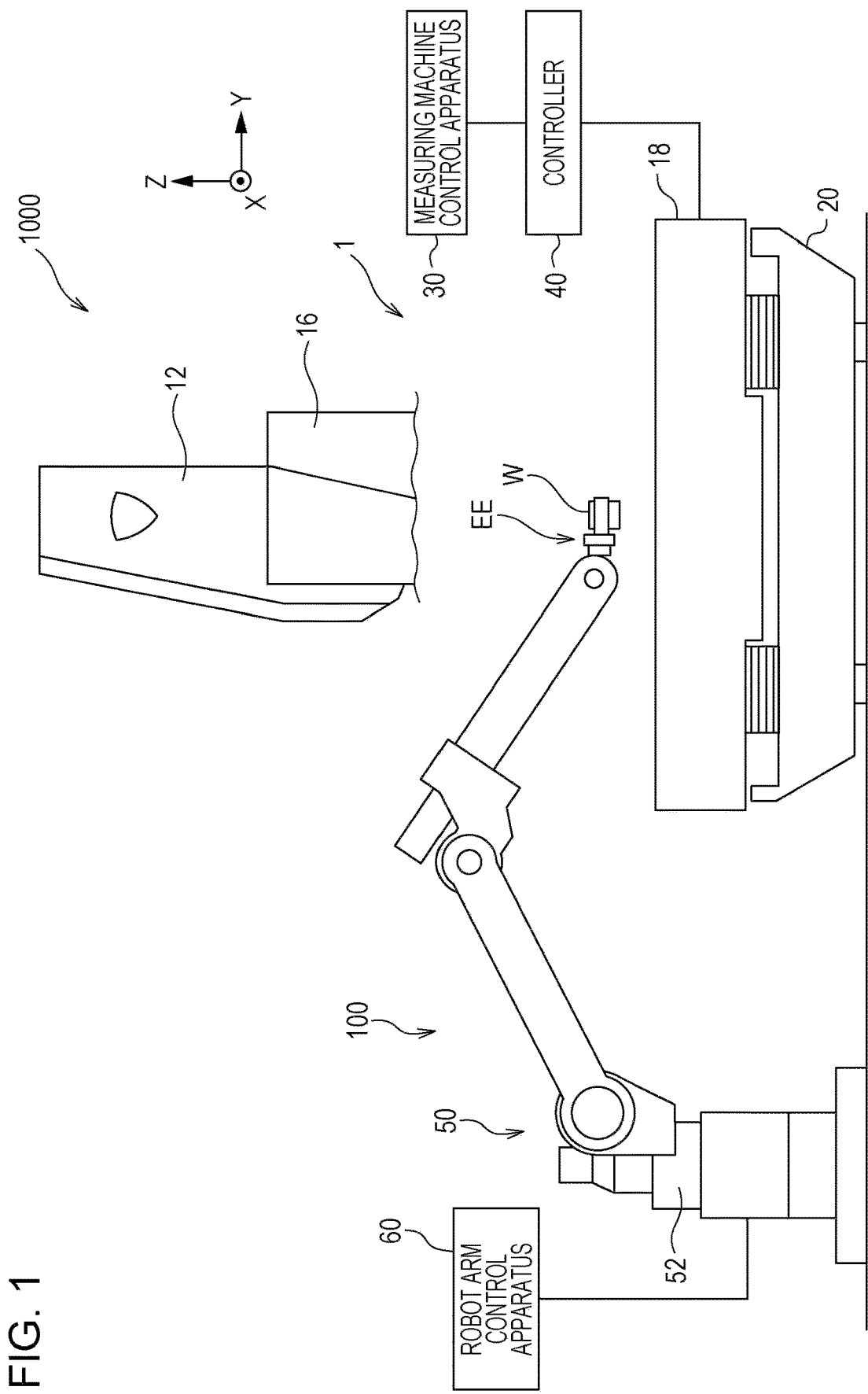
FIG. 1 is a diagram illustrating an example of a three-dimensional measuring system according to a first embodiment.

Hereinafter, embodiments of a measuring method according to the presently disclosed subject matter is described with reference to the accompanying drawings. Note that the same components in the drawings are basically denoted by the same reference numerals.

First Embodiment

[Three-Dimensional Measuring Machine]

FIG. 1 is a diagram schematically illustrating a configuration of a three-dimensional measuring system 1000 according to this embodiment. In FIG. 1, portions of columns 16 of a three-dimensional measuring machine 1 are omitted in the drawing so that a robot arm 50 is included in the drawing. The three-dimensional measuring system 1000 includes the three-dimensional measuring machine 1 and a robot arm apparatus 100. As illustrated in FIG. 1, a robot base 52 of the robot arm 50 is disposed outside a surface plate 18 of the three-dimensional measuring machine 1 in this embodiment.

Figure 2:
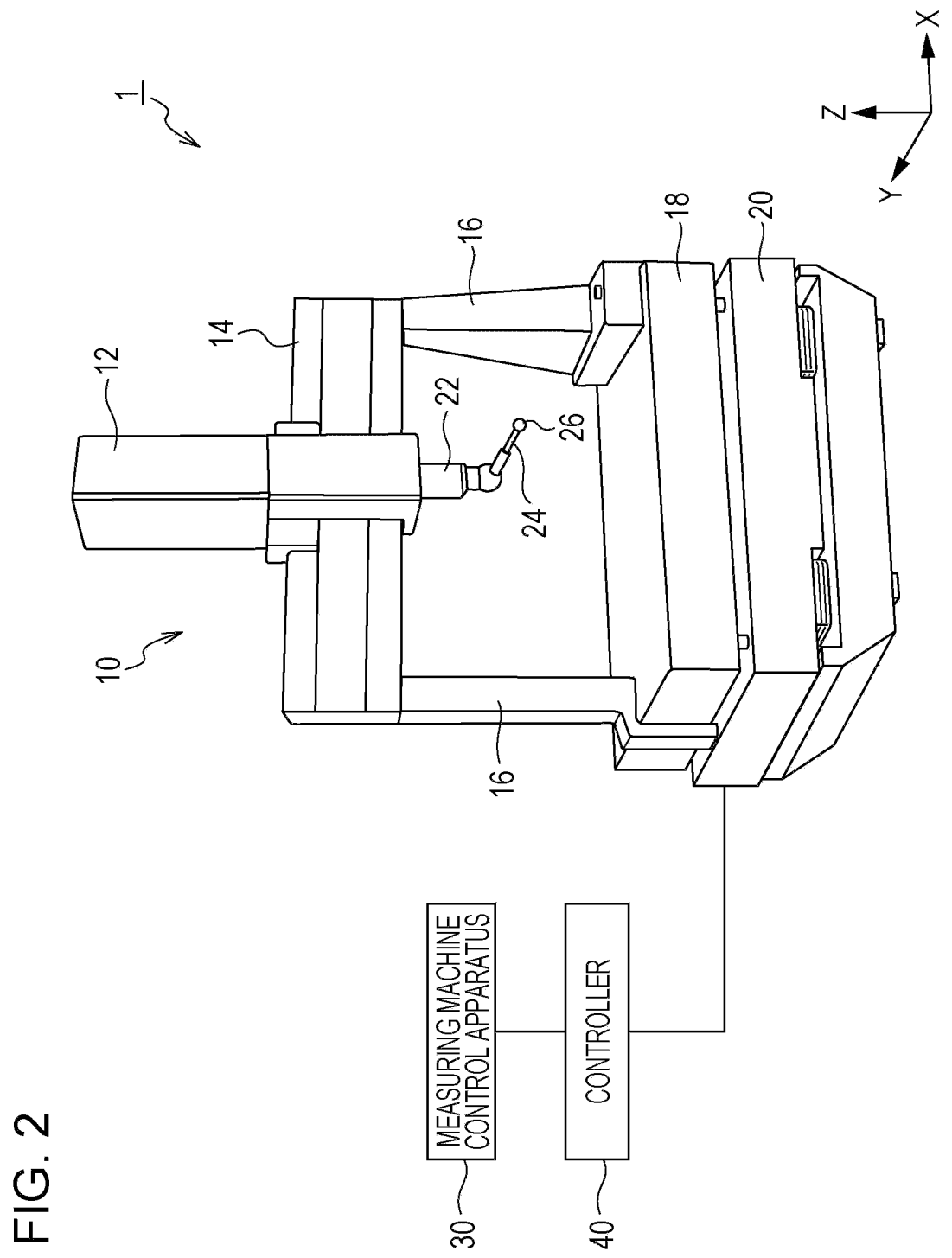
FIG. 2 is a diagram illustrating an example of a three-dimensional measuring machine.

FIG. 2 is a diagram (a perspective view and a block diagram) illustrating an example of the three-dimensional measuring machine 1 used in this embodiment. Note that, description is made hereinafter using a three-dimensional rectangular coordinate system.

As illustrated in FIG. 2, the three-dimensional measuring machine 1 according to this embodiment includes a measuring machine body 10 and a measuring machine control apparatus 30. A contact-type three-dimensional measuring machine including a contact-type probe is described hereinafter as the three-dimensional measuring machine 1. The three-dimensional measuring machine 1 may be obviously a noncontact-type three-dimensional measuring machine. When the three-dimensional measuring machine 1 is a noncontact-type three-dimensional measuring machine, a laser probe may be used instead of a contact-type probe 22 described below, for example.

First, the measuring machine body 10 is described. The measuring machine body 10 is an apparatus that measures a shape (a contour), a size, and the like of a workpiece W by causing a gauge head 26 formed at a tip end of the probe 22 (including a stylus 24) to perform scanning while the gauge head 26 is brought into contact with the workpiece W to be measured.

As illustrated in FIG. 2, the measuring machine body 10 includes the base 20 and the surface plate 18 disposed on the base 20. A surface of the surface plate 18 is formed to be flat in parallel to an X-Y plane.

A pair of columns (pillars) 16 extending upward (+Z direction) in the drawing from the surface of the surface plate 18 is disposed on the surface plate 18. A beam 14 extends across upper end portions (end portions on a +Z side) of the columns 16. The pair of columns 16 is movable on the surface plate 18 in a Y direction in synchronization with each other, and the beam 14 is movable in the Y direction in a state in which the beam 14 is in parallel to an X direction. As driving means for moving the columns 16 relative to the surface plate 18, a motor can be used. Note that the beam 14 and the columns 16 form a gate, and therefore, a gate-type three-dimensional measuring machine 1 is obtained.

A head 12 extending in the Z direction is attached to the beam 14. The head 12 is movable in a longitudinal direction (the X direction) of the beam 14. As driving means for moving the head 12 relative to the beam 14, a motor can be used.

The probe 22 is attached to a lower end portion (an end portion on a −Z side) of the head 12 such that the probe 22 is movable in a vertical direction (the Z direction) in the drawing. As driving means for moving the probe 22 in the vertical direction, a motor can be used.

The measuring machine body 10 includes a movement amount measuring unit (such as a linear encoder, not illustrated) used to measure individual movement amounts of the columns 16, the head 12, and the probe 22.

The probe 22 includes a shaft-shaped member having high rigidity (the stylus 24). As material of the stylus 24, super hard alloy, titanium, stainless, ceramics, carbon fibers, or the like can be used, for example.

The gauge head 26 is disposed at a tip end portion of the stylus 24 of the probe 22. The gauge head 26 is a member of a ball shape having a high degree of hardness and excellent abrasion resistance. As material of the gauge head 26, ruby, silicon nitride, zirconia, ceramics, or the like can be used, for example. The gauge head 26 has a diameter of 4.0 mm (hereinafter referred to as a stylus diameter), for example.

When the workpiece W is measured, the gauge head 26 is brought into contact with the workpiece W by moving the columns 16, the head 12, and the probe 22 in the X, Y, and Z directions. Then a displacement amount and the like of the gauge head 26 is measured while scanning is performed by the gauge head 26 along a contour of the workpiece W. Data on a measured value of the displacement amount or the like is transmitted to the measuring machine control apparatus 30. The measuring machine control apparatus 30 can obtain a shape (the contour), a size, and the like of the workpiece W by processing the data using a general measuring program.

A controller 40 is means for performing communication with the measuring machine body 10 and performs a process of converting data transmitted to and received from the measuring machine body 10. The controller 40 may include a D/A (digital-to-analog) converter that converts a digital instruction transmitted from the measuring machine control apparatus 30 to the measuring machine body 10 into an analog signal and an A/D (analog-to-digital) converter that converts data of a measured value or the like transmitted from the measuring machine body 10 to the measuring machine control apparatus 30 into digital data.

[Robot Arm]

Figure 3:
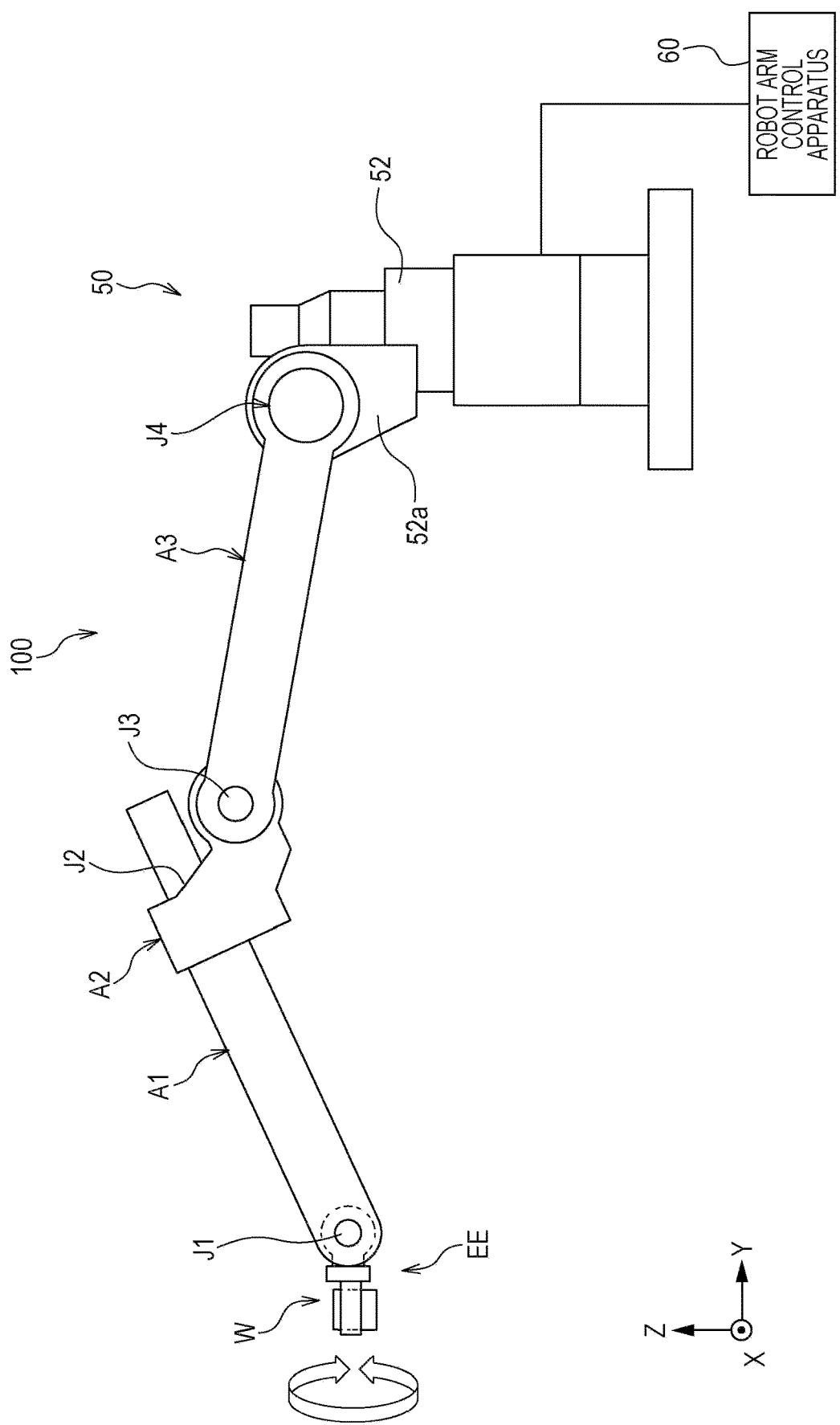
FIG. 3 is a diagram illustrating an example of a robot arm.

FIG. 3 is a diagram (a concept diagram and a block diagram) illustrating an example of the robot arm apparatus 100 used in this embodiment.

The robot arm apparatus 100 includes a robot arm 50 and a robot arm control apparatus 60. The robot arm 50 includes a plurality of movable portions and a plurality of motors driving the respective movable portions. The robot arm control apparatus 60 activates the robot arm 50 by controlling the motors included in the robot arm 50. The robot arm control apparatus 60 includes a computer and automatically activates the robot arm 50 by a user operation or a dedicated program.

The robot arm 50 is designed to be capable of holding the workpiece W. Specifically, the robot arm 50 holds (grasps) the workpiece W by an end effector EE coupled with a first joint portion (a wrist portion) J1. Furthermore, the end effector EE can freely change an attitude of the workpiece W. For example, the end effector EE can rotate in parallel to a Y-Z plane or rotate in parallel to an X-Y plane so as to change an attitude of the workpiece W.

As illustrated in FIG. 3, the robot arm 50 is a multi joint arm including four joint portions (a first joint portion J1 to a fourth joint portion J4), three arms (a first arm A1 to a third arm A3) coupled with one another in turn by the joints, and a robot base 52. Specifically, the first joint portion J1 couples the end effector EE and the first arm A1 with each other, and the end effector EE is rotatable relative to the first arm A1. The second joint portion J2 couples the first arm A1 and the second arm A2 with each other, and the first arm A1 is rotatable around an axis extending in a longitudinal direction of the first arm A1. The third joint portion J3 couples the second arm A2 and the third arm A3 with each other, and the second arm A2 is rotatable around an axis extending in a horizontal direction relative to the third arm A3. The fourth joint portion J4 couples the third arm A3 and a tip end portion 52a of the robot base 52 with each other, and the third arm A3 is rotatable around an axis extending in a horizontal direction relative to the robot base 52. Note that the robot arm apparatus 100 illustrated in FIG. 3 is merely an example, and a general robot arm apparatus of another form may be used.

[Measuring Method]

Figure 4:
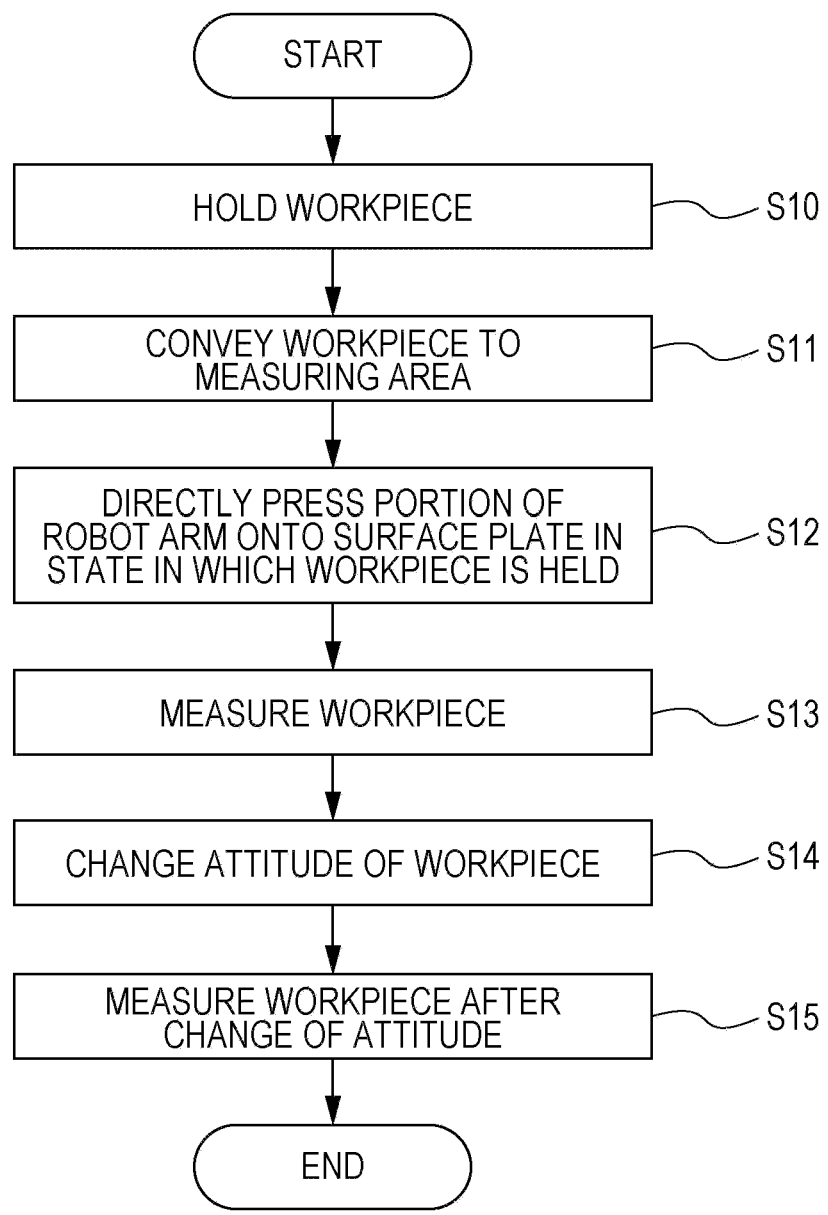
FIG. 4 is a flowchart of a three-dimensional measuring method according to a first embodiment.

Next, a measuring method using the robot arm apparatus 100 and the three-dimensional measuring machine 1 is described. FIG. 4 is a flowchart of a measuring method using the robot arm apparatus 100 and the three-dimensional measuring machine 1.

The robot arm apparatus 100 holds the workpiece W positioned outside a measuring space of the three-dimensional measuring machine 1 by the end effector EE (step S10) and conveys the workpiece W into the measuring space of the three-dimensional measuring machine 1 while holding the workpiece W (step S11: a conveying step). Thereafter, a portion of the robot arm 50 is directly pressed (directly abuts) on an upper surface of the surface plate 18 (hereinafter referred to as "on the surface plate 18") in a state in which the workpiece W is held by the end effector EE so that a measuring attitude of the workpiece W is determined (step S12: a mounting step). Thereafter, the three-dimensional measuring machine 1 measures the workpiece W (step S13: a measuring step). Subsequently, the robot arm apparatus 100 operates the end effector EE so as to change an attitude of the workpiece W while holding the workpiece W (step S14: a changing step). Then the three-dimensional measuring machine 1 measures the workpiece W after the attitude of the workpiece W is changed (step S15).

Next, a main step (a process) of the measuring method described above is described in detail.

[Conveying Step (Carrying Step)]

Figure 5:
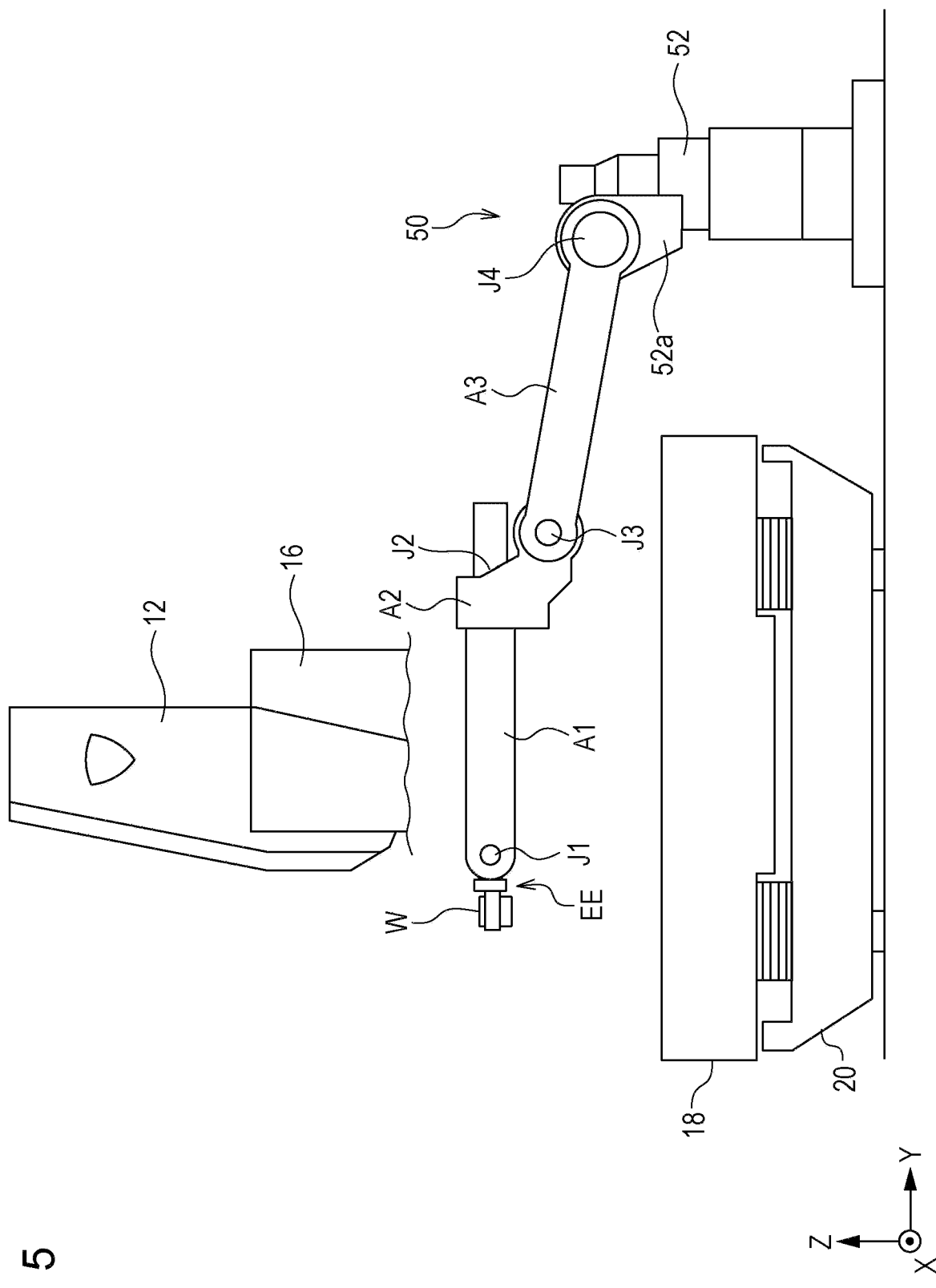
FIG. 5 is a diagram illustrating an example of a step of conveying a workpiece according to the first embodiment.

FIG. 5 is a diagram illustrating an example of the step of conveying the workpiece W (step S11 in FIG. 4). As illustrated in FIG. 5, the robot arm apparatus 100 holds the workpiece W positioned outside the measuring space of the three-dimensional measuring machine 1 by the end effector EE and conveys the workpiece W into the measuring space of the three-dimensional measuring machine 1 while holding the workpiece W. Note that the measuring machine control apparatus 30, the controller 40, and the robot arm control apparatus 60 are omitted in FIGS. 5 to 11. Furthermore, in FIGS. 5 to 11, portions of the columns 16 of the three-dimensional measuring machine 1 are omitted in the drawings so that the robot arm 50 is included in the drawings.

[Mounting Step and Measuring Step]

Figure 6:
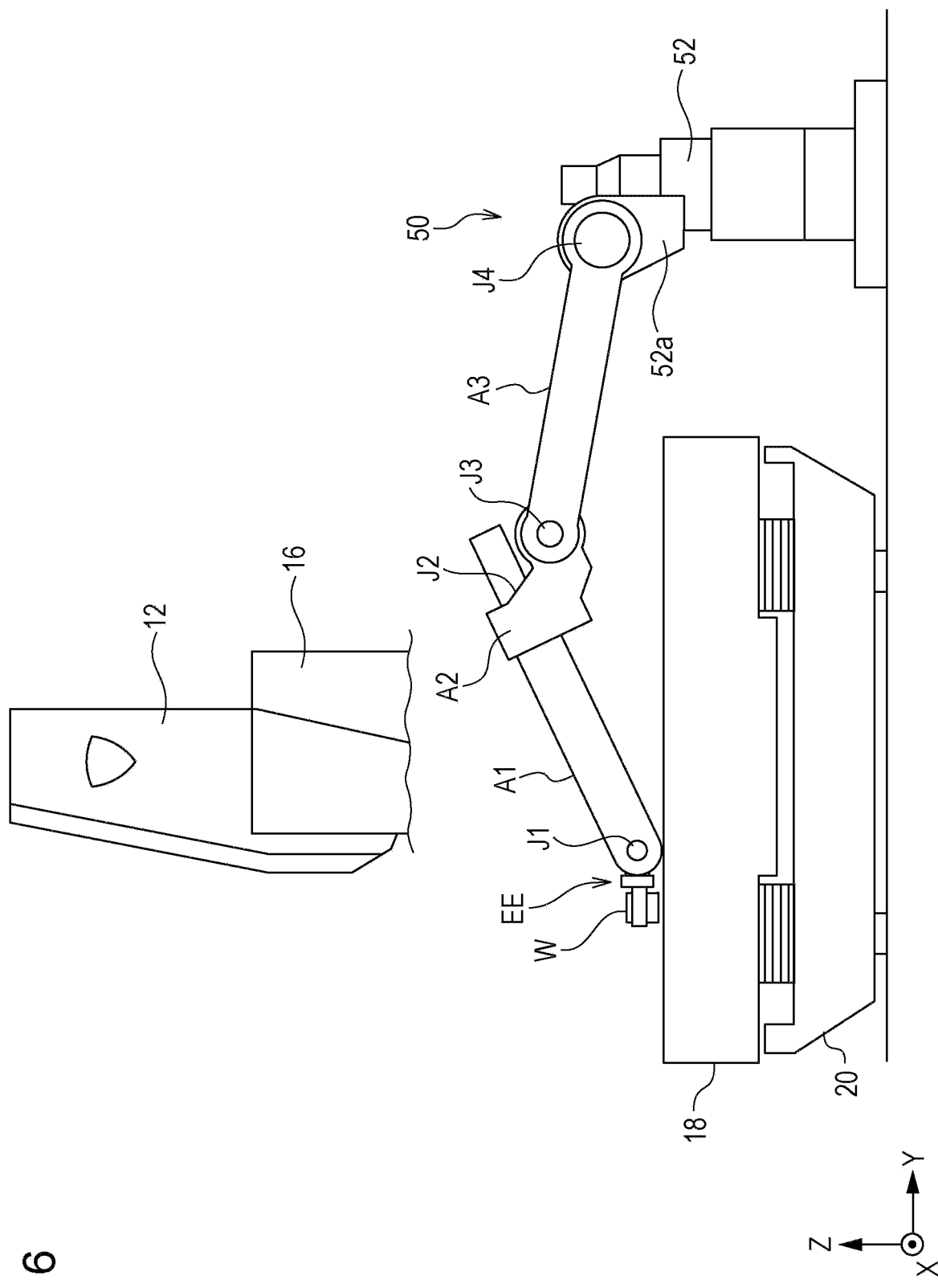
FIG. 6 is a diagram illustrating an example of a mounting step and a measuring step according to the first embodiment.

FIG. 6 is a diagram illustrating examples of the mounting step (step S12 in FIG. 4) and the measuring step (step S13 in FIG. 4). After the workpiece W is conveyed to the measuring space of the three-dimensional measuring machine 1, a portion of the robot arm 50 is directly pressed onto the surface plate 18 so that an attitude of the workpiece W is determined. Thereafter, the three-dimensional measuring machine 1 measures the workpiece W.

In the case of FIG. 6, the first joint portion J1 (the wrist portion) that is a portion of the robot arm 50 and that is nearest to the end effector EE is directly pressed onto the surface plate 18 so that positioning of the workpiece W is performed. In this way, since the first joint portion J1 (an example of an abutting portion) of the robot arm 50 is directly pressed onto the surface plate 18, ground vibration (vibration in an outside environment) and vibration of the robot arm apparatus 100 itself are suppressed, and furthermore, influence on the tip end portion of the robot arm 50 and the workpiece W is suppressed.

Here, when the first joint portion J1 is not pressed onto the surface plate 18, the robot arm 50 is affected by the ground vibration and the vibration of the robot arm apparatus 100 itself. On the other hand, since the first joint portion J1 of the robot arm 50 is pressed onto the surface plate 18 as illustrated in FIG. 6 in this embodiment, influence of the vibration on the workpiece W is suppressed.

Furthermore, the tip end portion (a portion where the workpiece W is held) of the robot arm apparatus 100 is easily affected by the vibration described above. In the case of FIG. 6, the influence of the vibration is effectively suppressed since the first joint portion J1 that is a tip end portion of the robot arm 50 is pressed onto the surface plate 18.

Figure 7:
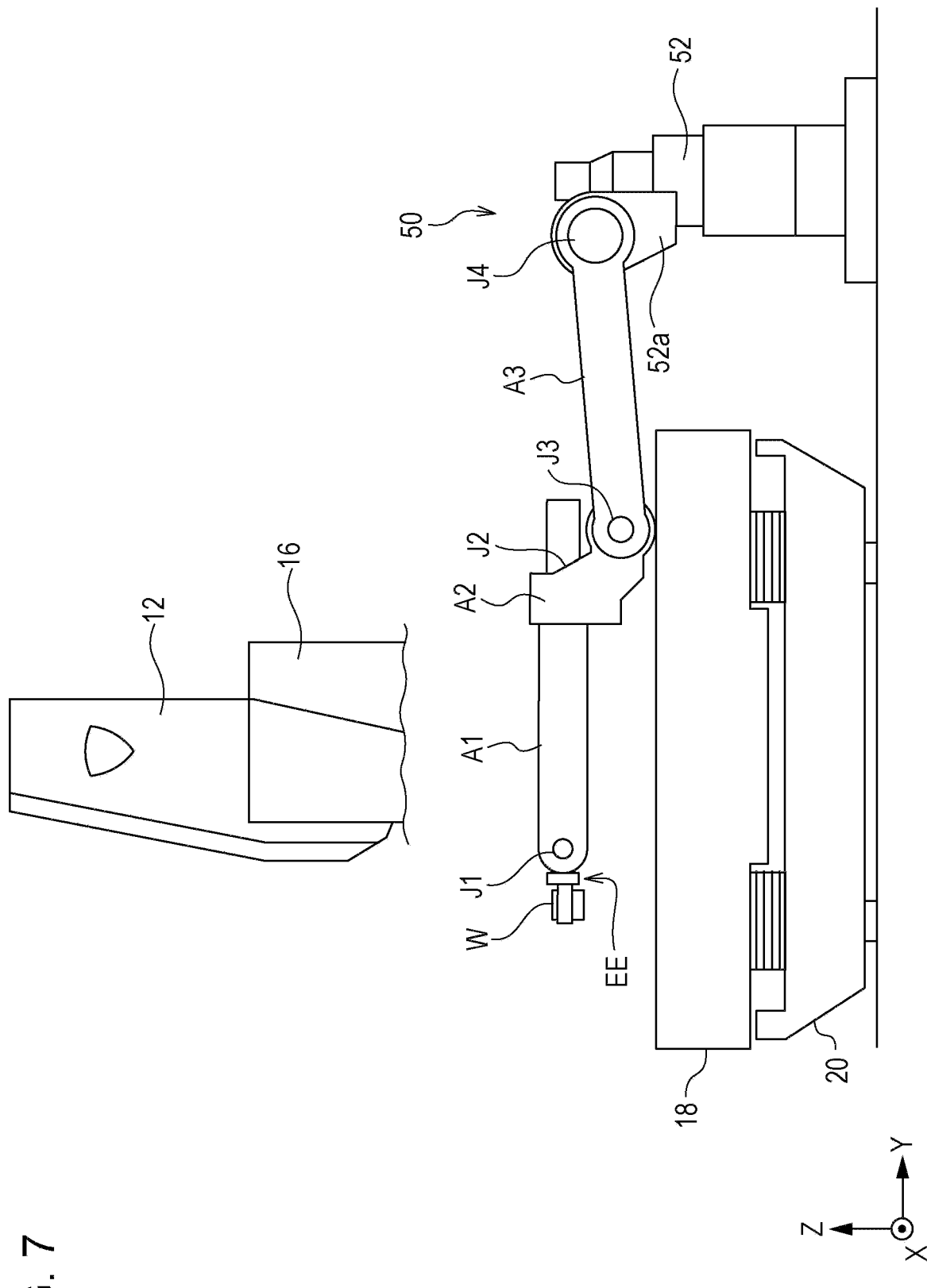
FIG. 7 is a diagram illustrating another example of the mounting step and the measuring step according to the first embodiment.

FIG. 7 is a diagram illustrating other examples of the mounting step and the measuring step. In the case of FIG. 7, the third joint portion (an elbow portion and an example of the abutting portion) J3 of the robot arm 50 is directly pressed onto the surface plate 18 so that positioning of the workpiece W is performed. In this way, also by directly pressing the third joint portion J3 onto the surface plate 18, the ground vibration and the vibration of the robot arm apparatus 100 itself are suppressed, and furthermore, influence of the vibration on the workpiece W held by the end effector EE of the robot arm 50 can be suppressed.

[Changing Step]

Figure 8:
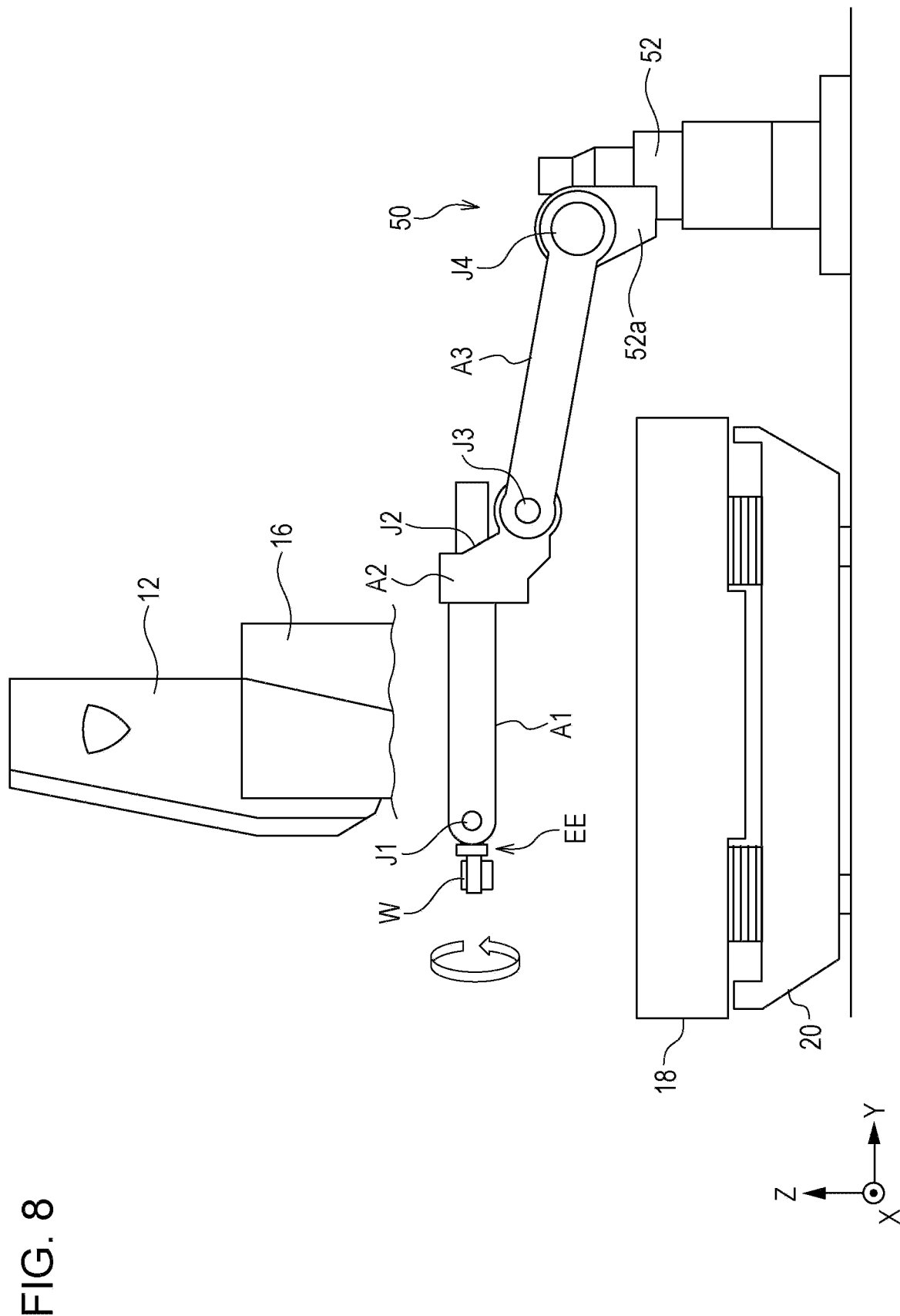
FIG. 8 is a diagram illustrating an example of a changing step according to the first embodiment.

FIG. 8 is a diagram illustrating an example of the changing step (step S14 in FIG. 4). As illustrated in FIG. 8, when an attitude of the workpiece W is to be changed, a portion (the first joint portion J1, for example) of the robot arm 50 is separated from the surface plate 18 for the change of the attitude of the workpiece W. The robot arm 50 rotates the end effector EE in parallel to the X-Z plane so as to change the attitude of the workpiece W. For example, after a front surface of the workpiece W is measured, the attitude of the workpiece W is changed to measure a back surface of the workpiece W in the changed attitude of the workpiece W. After the attitude of the workpiece W is changed, a portion of the robot arm 50 is pressed onto the same portion of the surface plate 18 as the position before the attitude of the workpiece W is changed. In this state, the workpiece W is measured after the attitude is changed. Note that a position on the surface plate 18 where the portion of the robot arm 50 is pressed before the change of the attitude of the workpiece W may be different from that after the change. As described above, since the attitude of the workpiece W can be changed by operating the end effector EE, different measuring jigs are not required for different attitudes of the workpiece W and the attitude of the workpiece W can be easily changed.

{Modification of First Embodiment}

In the embodiment described above, a mode in which the joint portion (the joint portion J1 or J3) of the robot arm 50 is pressed onto the surface plate 18 (step S12 in FIG. 4) is described as an example of the mode in which a portion of the robot arm 50 is directly pressed onto the surface plate 18. However, the presently disclosed subject matter is not limited to this and a portion of the robot arm 50 may be indirectly pressed onto the surface plate 18 in step S12 of FIG. 4. As an example of the mode in which a portion of the robot arm 50 is indirectly pressed onto the surface plate 18, a case where a portion of the robot arm 50 is pressed onto a damping member (a block) disposed on the surface plate 18 is described.

Figure 9:
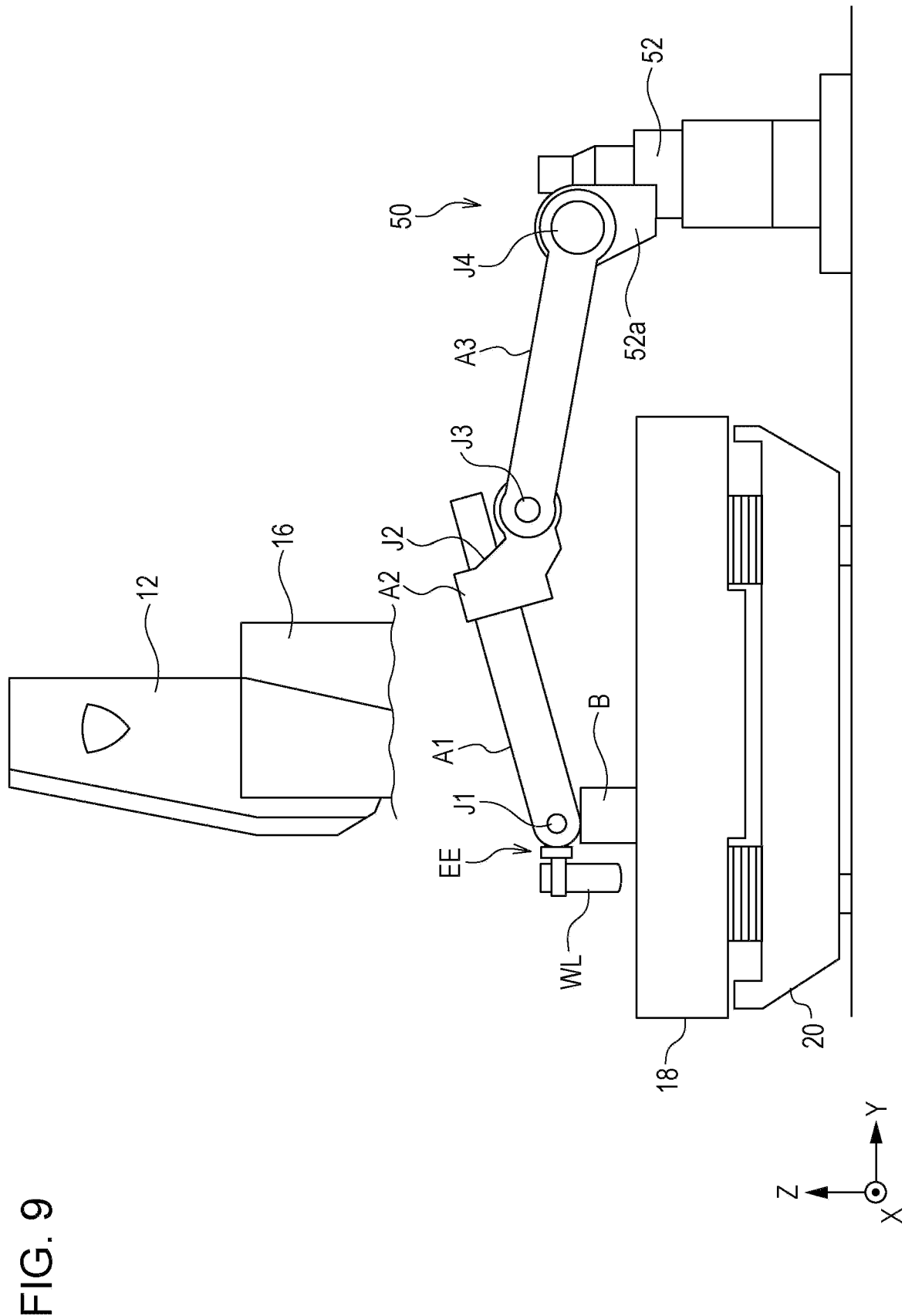
FIG. 9 is a diagram illustrating an example in which a joint portion is pressed on a block on a surface plate.

FIG. 9 is a diagram illustrating an example in which the first joint portion J1 serving as a portion of the robot arm 50 is pressed onto an upper surface of a block B (hereinafter referred to as "on the block B") on the surface plate 18. In this way, when the first joint portion J1 is pressed onto the block B disposed on the surface plate 18, the effect obtained when the first joint portion J1 is directly pressed onto the surface plate 18 can be obtained. Specifically, the ground vibration and the vibration of the robot arm apparatus 100 itself can be suppressed by pressing the first joint portion J1 onto the block B. Furthermore, a space can be ensured between the end effector EE and the surface plate 18 when the first joint portion J1 is pressed onto the block B, and therefore, even a workpiece WL having a long length in the Z direction can be held and measured while the workpiece WL is not in contact with the surface plate 18.

Note that a shape and material of the block B are not particularly limited. The shape and the material of the block B are selected taking the fact that a portion of the robot arm 50 is pressed onto the block B disposed on the surface plate 18 and the fact that vibration is effectively suppressed since a portion of the robot arm 50 is pressed onto the block B into consideration.

Furthermore, since a portion of the robot arm 50 is directly (or indirectly) pressed onto the surface plate 18 according to this embodiment, measuring accuracy can be maintained even when the surface plate 18 is inclined due to a movement of the gate when compared with a case where the robot arm 50 is not pressed onto the surface plate 18 as described below.

Figure 10:
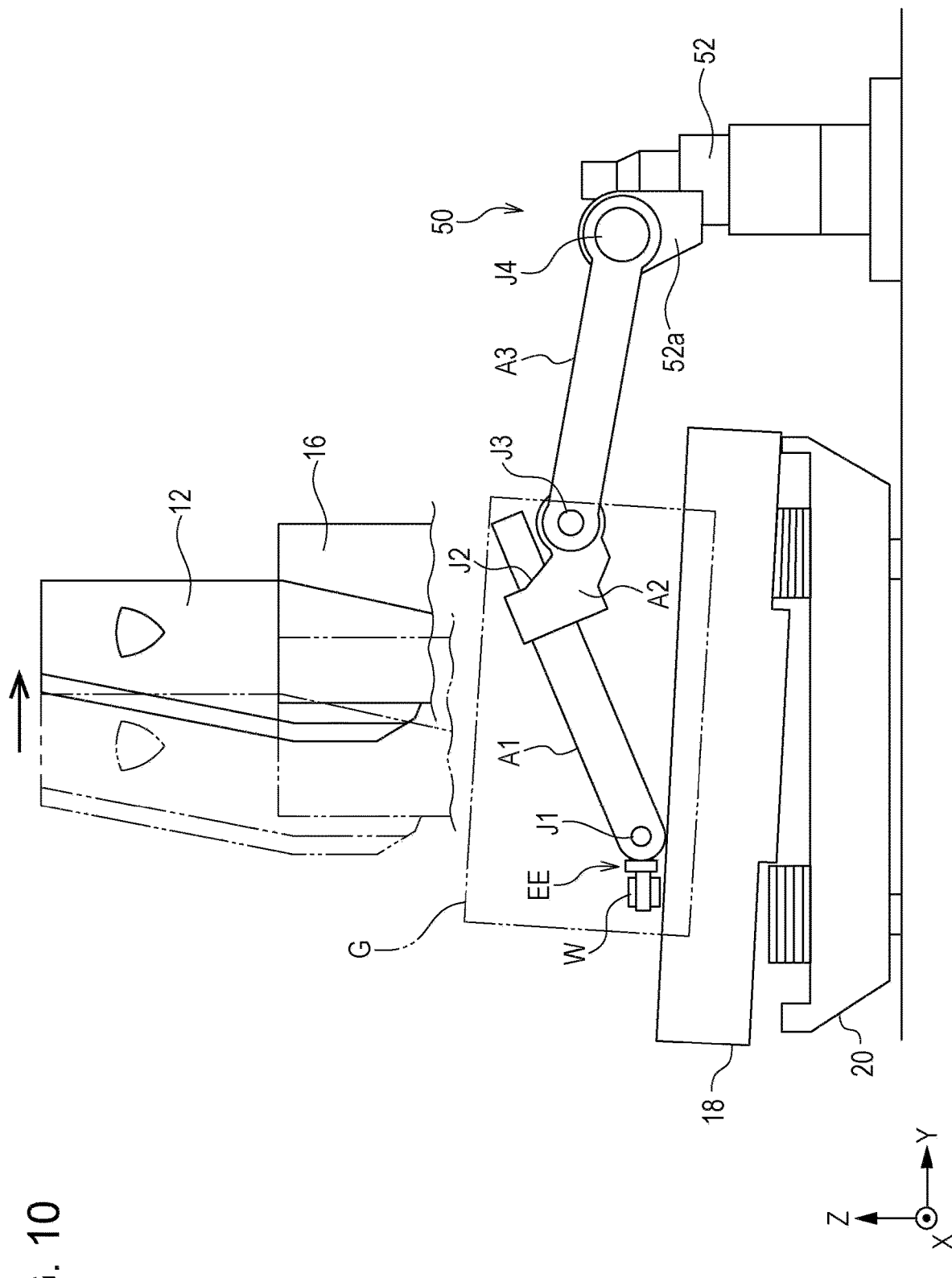
FIG. 10 is a diagram illustrating a case where a gate of the three-dimensional measuring machine is moved in a state in which a portion of the robot arm is directly pressed onto the surface plate according to the first embodiment.

FIG. 10 is a diagram illustrating a case where the gate of the three-dimensional measuring machine 1 is moved in a state in which a portion of the robot arm 50 is directly pressed onto the surface plate 18. Note that an inclination of the surface plate 18 illustrated in FIG. 10 is exaggerated for explanation, and the inclination of the surface plate 18 is actually small. When the gate is moved along a Y axis, the surface plate 18 is slightly inclined due to a weight of the gate. Specifically, when the gate is moved in a positive direction of the Y axis, the surface plate 18 sinks in a movement destination due to the weight of the gate, and on the other hand, the surface plate 18 rises in the opposite direction. Consequently, the surface plate 18 is slightly inclined. Furthermore, the surface plate 18 is a reference of the measuring space (a measuring area) G, and therefore, the measuring space G of the three-dimensional measuring machine 1 is also inclined as illustrated in FIG. 10 as the surface plate 18 is inclined.

Figure 11:
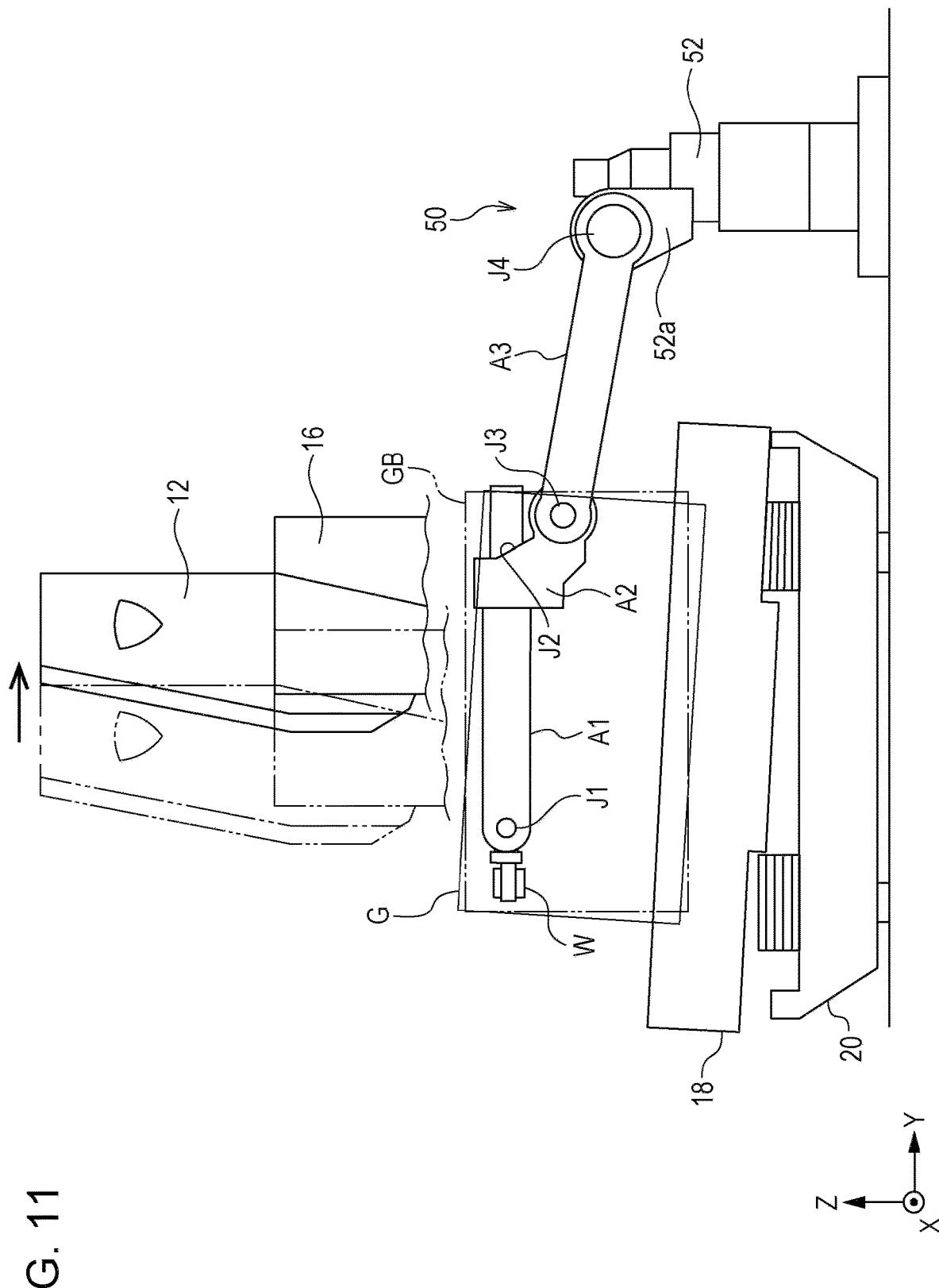
FIG. 11 is a diagram illustrating a case where the gate of the three-dimensional measuring machine is moved while a portion of the robot arm is not pressed onto the surface plate according to the first embodiment.

Here, a problem that arises when the workpiece W is measured while the robot arm 50 is not directly (or indirectly) pressed onto the surface plate 18 is described. FIG. 11 is a diagram illustrating a case where the gate of the three-dimensional measuring machine 1 is moved while the robot arm 50 is not pressed onto the surface plate 18. When the robot arm 50 is not pressed onto the surface plate 18, the robot arm 50 does not move in accordance with an inclination of the surface plate 18 and the workpiece W held by the robot arm 50 is in a holding (fixed) state in a certain position irrespective of the inclination of the surface plate 18. Although a measuring space GB is changed to a measuring space G in accordance with the inclination of the surface plate 18, the position of the workpiece W cannot follow the change and the workpiece W remains in the certain position. Consequently, when the surface plate 18 is inclined due to a movement of the gate, the relative positional relationship between the surface plate 18 (the measuring space) and the workpiece W is considerably changed as the surface plate 18 inclines, and therefore, it is difficult to maintain the measuring accuracy.

On the other hand, according to this embodiment (refer to FIG. 10), measurement is performed in a state in which a portion (the first joint portion J1) of the robot arm 50 is directly (or indirectly) pressed onto the surface plate 18. Accordingly, even when the surface plate 18 is inclined, a position (an attitude) of the robot arm 50 is changed by a degree corresponding to the inclination of the surface plate 18, and a position of the workpiece W is also changed in accordance with the change. Specifically, since the workpiece W is moved in accordance with the inclination of the surface plate 18, a large shift is hardly generated in the relative position between the surface plate 18 and the workpiece W. Therefore, even when the measuring space G is moved in accordance with the movement of the gate, a shift is hardly generated in the relative position between the workpiece W and the measuring space G, and therefore, the measuring accuracy can be maintained when compared with the case where a portion of the robot arm 50 is not pressed onto the surface plate 18 (refer to FIG. 11).

As described above, when the robot arm 50 is pressed onto the surface plate 18, a position of the workpiece W can be moved in accordance with a change in the measuring space even when the gate is moved, and therefore, the measuring accuracy of the three-dimensional measuring machine 1 can be maintained.

Although the example in which the joint portion serving as a portion of the robot arm 50 is directly or indirectly pressed onto the surface plate 18 is illustrated in the description above, a portion to be pressed onto the surface plate 18 is not limited to the joint portion of the robot arm 50 as long as an effect of suppression of vibration to the workpiece W is attained. For example, an arm (the arm A1 to the arm A3) of the robot arm 50 may be directly or indirectly pressed onto the surface plate 18, or another portion of the robot arm 50 may be directly or indirectly pressed onto the surface plate 18. Furthermore, a portion onto which a portion of the robot arm 50 is to be directly or indirectly pressed is not limited to the upper surface of the surface plate 18, and a portion of the robot arm 50 may be directly or indirectly pressed onto a side surface of the surface plate 18.

Second Embodiment

Figure 12:
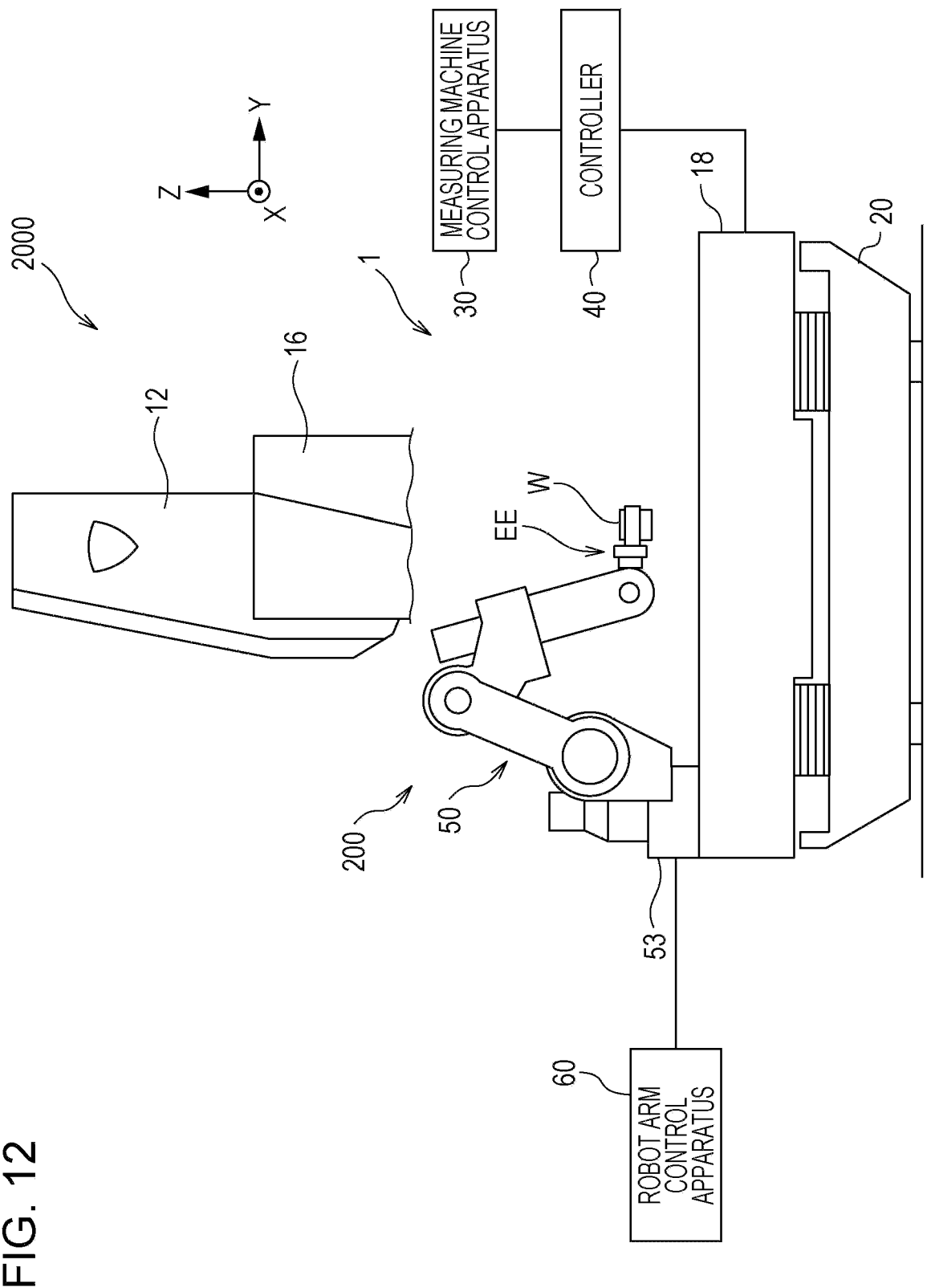
FIG. 12 is a diagram schematically illustrating a configuration of a three-dimensional measuring system according to a second embodiment.

Next, a three-dimensional measuring system 2000 according to a second embodiment is described. FIG. 12 is a diagram schematically illustrating a configuration of a three-dimensional measuring system 2000 according to the second embodiment. As illustrated in FIG. 12, the three-dimensional measuring system 2000 according to the second embodiment includes a three-dimensional measuring machine 1 and a robot arm apparatus 200. Although the robot arm apparatus 100 according to the first embodiment includes the robot base 52 disposed outside the surface plate 18 of the three-dimensional measuring machine 1, the robot arm apparatus 200 according to the second embodiment includes a robot base 53 disposed on a surface plate 18 of the three-dimensional measuring machine 1 instead of the robot base 52.

Note that a configuration other than a position of the robot base 53 is basically the same as that of the first embodiment and a method for measuring a workpiece W in the configuration of the second embodiment is also basically the same as that of the first embodiment, and therefore, descriptions thereof are omitted. Furthermore, it is preferable that the robot arm apparatus 200 is relatively small for arrangement on the surface plate 18.

As with the first embodiment, an attitude of a workpiece can be easily changed also in the second embodiment since three-dimensional measurement can be performed while the workpiece is held by an end effector EE of a robot arm 50.

Furthermore, since the robot base 53 is disposed on the surface plate 18 in the three-dimensional measuring system 2000 according to the second embodiment, a vibration system of the robot arm apparatus 200 is the same as a vibration system in a horizontal direction (X and Y directions) and a vertical direction (a Z direction) of the three-dimensional measuring machine 1, and accordingly, the robot arm apparatus 200 is hardly affected by vibration of an outside environment. Consequently, influence of the vibration in the outside environment can be reduced and accuracy of the three-dimensional measurement performed on the workpiece W can be improved.

Figure 13:
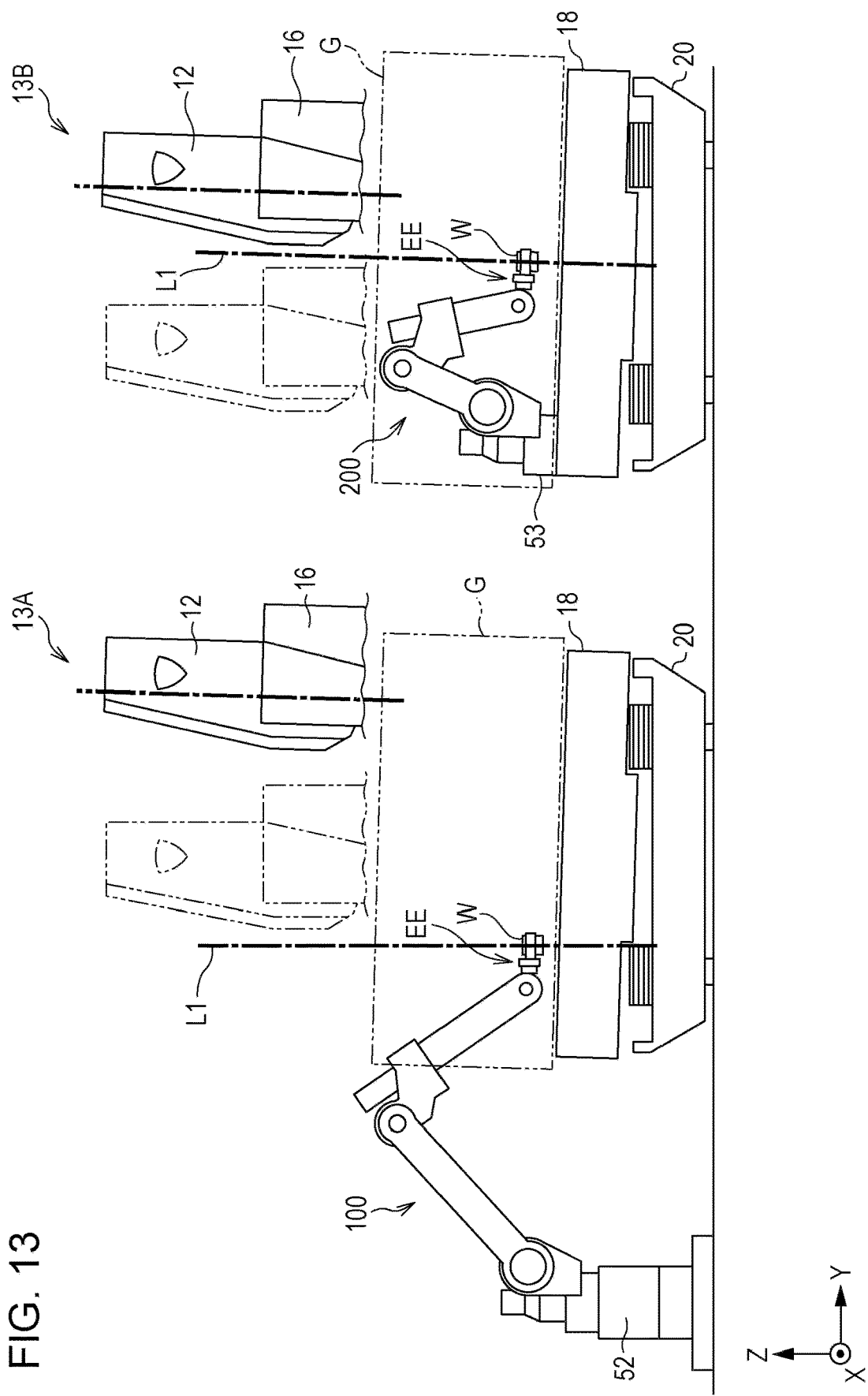
FIG. 13 is a diagram illustrating influence of a movement of a gate of a three-dimensional measuring machine on measuring accuracy in the three-dimensional measuring system according to the second embodiment.

Next, measuring accuracy affected by a change in an attitude of the surface plate 18 in the three-dimensional measuring system 2000 according to the second embodiment is described with reference to FIG. 13. In FIG. 13, a reference numeral 13A designates a case where measurement is performed in a state in which a portion of the robot arm 50 does not directly or indirectly abut on the surface plate 18 in the three-dimensional measuring system 1000 according to the first embodiment (that is, this case is the same as the state in FIG. 11).

It is assumed that, before a gate of the three-dimensional measuring machine 1 is moved, the surface plate 18 is parallel to an X-Y plane and a center axis of the workpiece W is parallel to a Z direction. As designated by a reference numeral 13A, it is assumed that an attitude of the surface plate 18 is changed such that the surface plate 18 is inclined relative to the horizontal direction due to a weight of the gate since the gate of the three-dimensional measuring machine 1 is moved in a positive direction of a Y axis so that a position of the gate of the three-dimensional measuring machine 1 is shifted from a position designated by a dashed-two-dotted line to a position designated by a solid line. Then a measuring space G is changed in accordance with the change in an attitude of the surface plate 18 as described with reference to FIG. 11. Since the robot base 52 is disposed outside the surface plate 18, a position (a center axis L1) of the workpiece W held by the end effector EE is not changed in accordance with the change in the attitude of the surface plate 18. Consequently, when the attitude of the surface plate 18 is changed due to the movement of the gate, the relative positional relationship between the surface plate 18 (and the measuring space G) and the workpiece W is changed and the change may have an adverse effect on the measurement accuracy.

A reference numeral 13B of FIG. 13 designates a case where the gate of the three-dimensional measuring machine 1 is moved similarly to the case of the reference numeral 13A in the three-dimensional measuring system 2000 according to the second embodiment. As designated by the reference numeral 13B, since the robot base 53 is disposed on the surface plate 18, a position of the workpiece W held by the end effector EE can be changed in accordance with an inclination of the surface plate 18. Consequently, even when the surface plate 18 is inclined due to the movement of the gate, the relative position between the surface plate 18 (and the measuring space G) and the workpiece W is not considerably changed in accordance with the inclination of the surface plate 18 and the measuring accuracy is maintained. In this way, according to the three-dimensional measuring system 2000 of the second embodiment, the robot arm apparatus 200 can follow the change in the attitude of the surface plate 18, and therefore, the three-dimensional measurement can be performed with high accuracy on the workpiece W while influence of the change in the attitude of the surface plate 18 is reduced.

A three-dimensional measuring method according to the second embodiment is the same as the three-dimensional measuring method according to the first embodiment illustrated in FIG. 4 except that the process of causing a portion of the robot arm 50 to abut on the surface plate 18 performed in step S12 is omitted. Therefore, a detailed description of the three-dimensional measuring method according to the second embodiment is omitted.

According to the first embodiment and the modification of the first embodiment, a portion of the robot arm 50 directly or indirectly abuts on the surface plate 18 so as to follow a change in the attitude of the surface plate 18 caused by the movement of the gate of the three-dimensional measuring machine 1. On the other hand, according to the three-dimensional measuring system 2000 of the second embodiment, since the robot base 53 is disposed on the surface plate 18, followability to the change in the attitude of the surface plate 18 can be ensured even though a portion of the robot arm 50 does not abut on the surface plate 18 at a time of measurement.

Therefore, the process in step S12 in the three-dimensional measuring method according to the first embodiment may be omitted in the second embodiment. Accordingly, a degree of freedom of the attitude of the robot arm 50 in measurement is improved in the second embodiment when compared with the first embodiment.

{Modification of Second Embodiment}

As described above, according to the first embodiment and the modification of the first embodiment, a portion (an abutting portion) of the robot arm 50, such as the joint portion J1 or the joint portion J3, directly or indirectly abuts on the surface plate 18 at the time of measurement. Similarly, a portion of the robot arm 50 may directly or indirectly abut on the surface plate 18 at the time of measurement also in the second embodiment. Specifically, according to a modification of the second embodiment, the process in step S12 is performed similarly to the three-dimensional measuring method according to the first embodiment illustrated in FIG. 4, for example.

Figure 14:
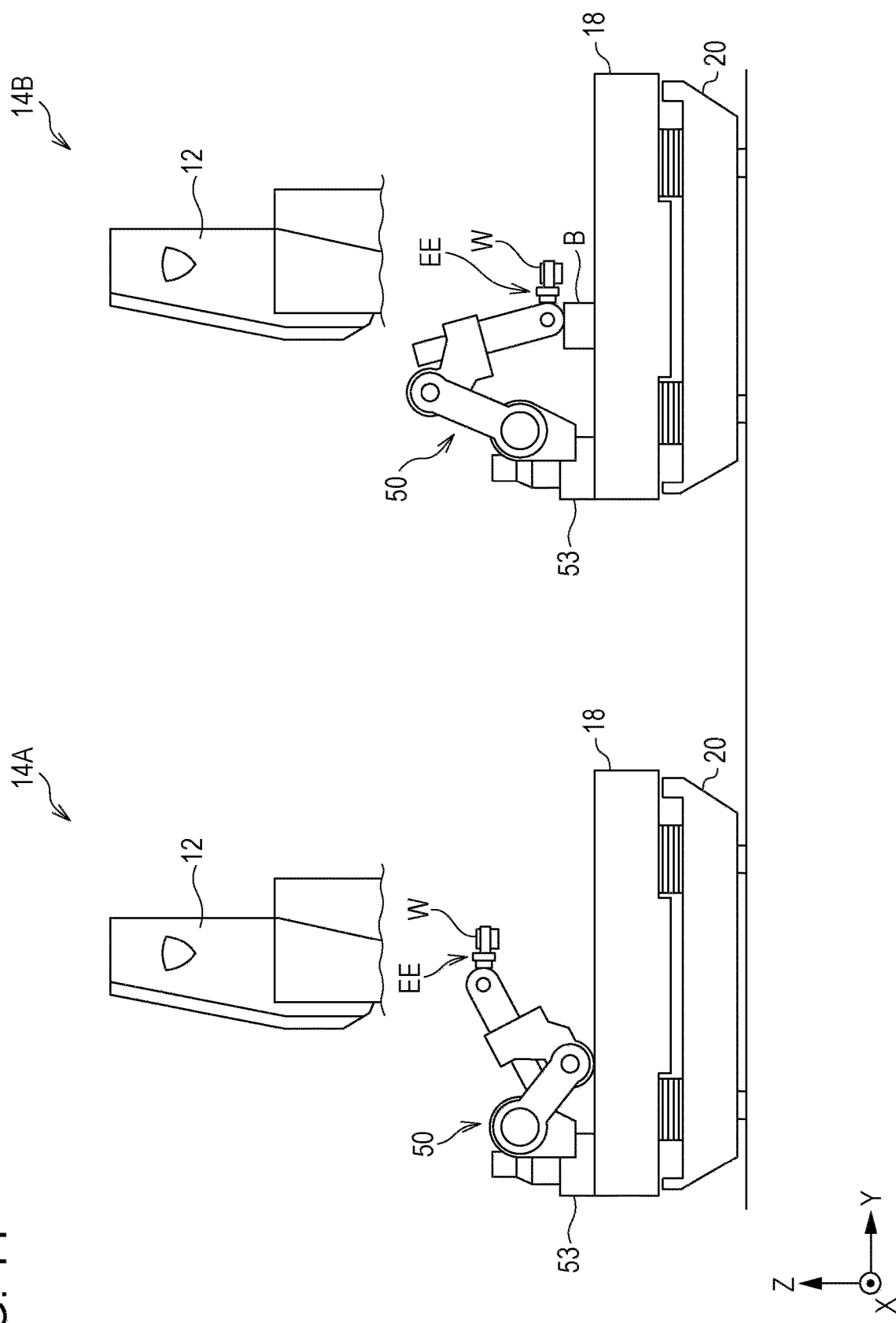
FIG. 14 is a diagram illustrating a state in which a portion of the robot arm directly or indirectly abuts on a surface plate in the three-dimensional measuring system according to the second embodiment.

A reference numeral 14A of FIG. 14 designates an example of a state in which a portion of the robot arm 50 directly abuts on the surface plate 18 in the three-dimensional measuring system 2000 according to the second embodiment. A reference numeral 14B designates an example of a state in which a joint portion of the robot arm 50 indirectly abuts on the surface plate 18 through a damping member (a block B in the drawing) disposed on the surface plate 18. The block B may be the same as that of the first embodiment.

As designated by the reference numerals 14A and 14B, since a portion of the robot arm 50 directly or indirectly abuts on the surface plate 18, vibration of the robot arm 50 itself can be reduced, and accordingly, measurement accuracy can be further improved. Furthermore, when a portion of the robot arm 50 indirectly abuts on the surface plate 18 through the block B (the case designated by the reference numeral 14B of FIG. 14), a gap can be ensured between the end effector EE and the surface plate 18 in a Z direction, and therefore, a workpiece W having a long length in the Z direction can be well measured. Note that, although the joint portion of the robot arm 50 directly or indirectly abuts on the surface plate 18 in the examples designated by the reference numerals 14A and 14B, the abutting portion is obviously not limited to the joint portion similarly to the modification of the first embodiment.

Third Embodiment

Figure 15:
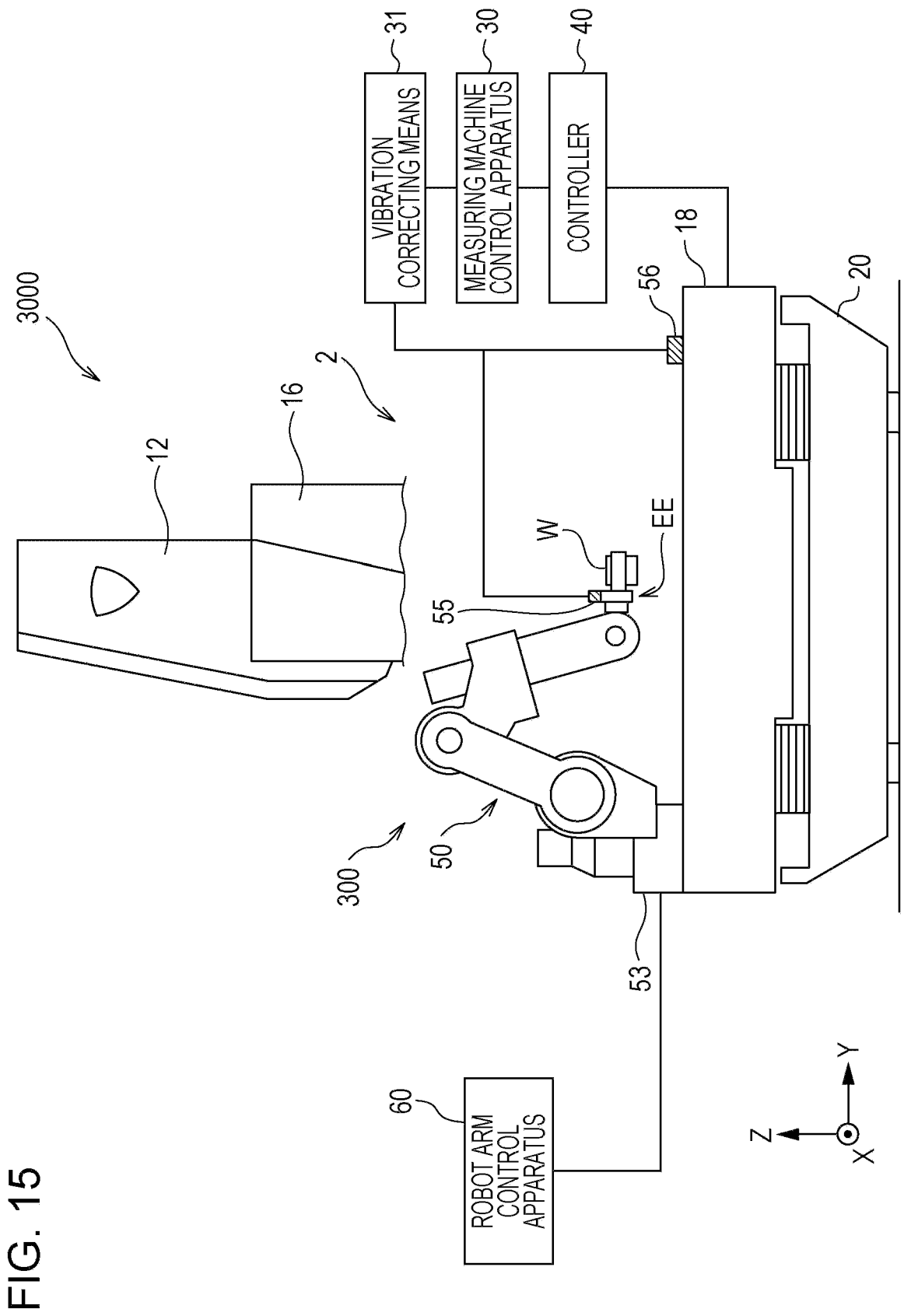
FIG. 15 is a diagram schematically illustrating a configuration of a three-dimensional measuring system according to a third embodiment.

Next, a three-dimensional measuring system 3000 according to a third embodiment is described. FIG. 15 is a diagram schematically illustrating a configuration of the three-dimensional measuring system 3000 according to the third embodiment. As illustrated in FIG. 15, the three-dimensional measuring system 3000 according to the third embodiment includes a three-dimensional measuring machine 2 and a robot arm apparatus 300. The robot arm apparatus 300 is constituted by adding arm vibration detecting means 55 serving as relative-position change detecting means to the robot arm apparatus 200 according to the second embodiment. The three-dimensional measuring machine 2 is constituted by adding vibration correcting means 31 (correcting means) to the three-dimensional measuring machine 1 according to the first embodiment.

Also in the third embodiment, an attitude of a workpiece can be easily changed since three-dimensional measurement can be performed while the workpiece is held by an end effector EE of a robot arm 50.

The relative-position change detecting means detects a change in a relative position between a surface plate 18 and the robot arm 50. The relative-position change detecting means may detect a change in a relative position on the robot arm 50 side or may detect a change in a relative position on the surface plate 18 side. Alternatively, the relative-position change detecting means may detect a change in the relative position on both the robot arm 50 side and the surface plate 18 side.

In FIG. 15, the arm vibration detecting means 55 is illustrated as an example of means for detecting vibration as a change in a relative position on the robot arm 50 side. In the robot arm apparatus 300, the arm vibration detecting means 55 detects vibration of the robot arm 50 itself in a horizontal direction (X and Y directions) and a vertical direction (a Z direction) caused by a driving system or the like of a motor of the robot arm 50 in real time in a state in which the workpiece W is held by the end effector EE and outputs a result of the detection to the correcting means 31 of the three-dimensional measuring machine 2. The term "real time" means that vibration (a change in a relative position) is detected at all time or at regular intervals in a period of time in which a detection of the vibration is required (a period of time in which the three-dimensional measurement is performed on the workpiece W). Furthermore, vibration may be detected at irregular intervals instead of the regular intervals. Furthermore, instead of the detection of vibration in real time, data on vibration may be received from an outside.

Here, an arbitrary type of vibration detecting apparatus can be used as the arm vibration detecting means 55. Examples of the arm vibration detecting means 55 include a position sensor, a vibration sensor, a laser tracker, and displacement measuring means. Furthermore, examples of the vibration sensor include an acceleration sensor and various types of gyroscope sensor. Moreover, examples of the displacement measuring means include a capacitance displacement sensor, an eddy current displacement sensor, and a laser interferometer.

In addition, the arm vibration detecting means 55 is preferably disposed in the vicinity of the end effector EE holding the workpiece W. By this, influence of vibration of the robot arm 50 itself on the workpiece W can be more accurately detected.

The vibration correcting means 31 of the three-dimensional measuring machine 2 calculates amplitudes in X, Y, and Z directions based on vibrations of the robot arm 50 in the X, Y, Z directions indicated by the arm vibration detecting means 55 and corrects a measured value of the three-dimensional measurement performed on the workpiece W in real time, for example, based on the calculated amplitudes. By this, influence of the vibration of the robot arm 50 can be reduced and measurement accuracy can be further improved.

Note that, instead of the arm vibration detecting means 55, surface-plate vibration detecting means 56 for detecting a change in a relative position between the surface plate 18 and the robot arm 50 on the surface plate 18 side may be disposed on the three-dimensional measuring machine 2 as the relative-position change detecting means. The surface-plate vibration detecting means 56 is disposed in the vicinity of the surface plate 18, e.g., on the surface plate 18. The surface-plate vibration detecting means 56 detects vibrations of the surface plate 18 in the X, Y, and Z directions as a change in the relative position in real time, for example. As with the case of the arm vibration detecting means 55, an arbitrary type of vibration detecting apparatus can be used as the surface-plate vibration detecting means 56.

The vibration correcting means 31 calculates amplitudes in the various directions based on the vibrations of the surface plate 18 in the various directions detected by the surface-plate vibration detecting means 56 and further corrects a measured value of the three-dimensional measurement performed on the workpiece W based on the amplitudes in the various directions. By this, influence of the vibration of the surface plate 18 can be reduced and measurement accuracy can be further improved.

Alternatively, the arm vibration detecting means 55 and the surface-plate vibration detecting means 56 may be disposed on the three-dimensional measuring machine 2 as the relative-position change detecting means. In this case, the vibration correcting means 31 corrects a measured value of the three-dimensional measurement performed on the workpiece W based on vibration of the robot arm 50 detected by the arm vibration detecting means 55 and vibration of the surface plate 18 detected by the surface-plate vibration detecting means 56.

Figure 16:
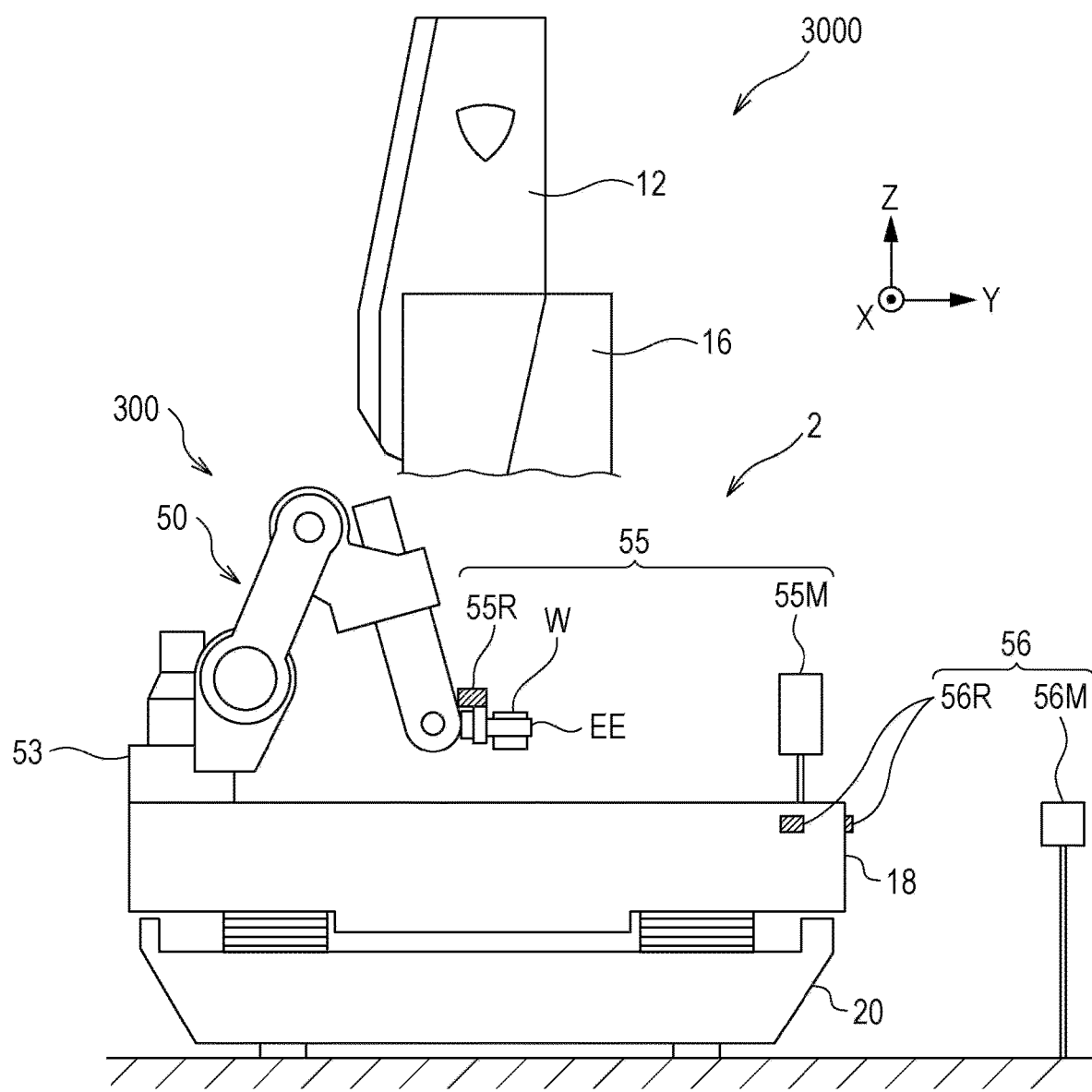
FIG. 16 is a diagram illustrating an example of arrangement of reflectors and laser tracker bodies when relative-position change detecting means includes a plurality of laser trackers.

Hereinafter, an example of a configuration of the relative-position change detecting means is described in detail. A case where the arm vibration detecting means 55 and the surface-plate vibration detecting means 56 serving as the relative-position change detecting means have a plurality of laser trackers is now described. FIG. 16 is a diagram illustrating an example of arrangement of reflectors of a plurality of laser trackers and a plurality of laser tracker bodies.

As illustrated in FIG. 16, a laser tracker serving as the arm vibration detecting means 55 includes a reflector 55R and a laser tracker body 55M. The reflector 55R is disposed on the end effector EE, for example, and the laser tracker body 55M is disposed on the three-dimensional measuring machine 2, for example.

Although the laser tracker body 55M is disposed on the surface plate 18 in FIG. 16, the laser tracker body 55M may be obviously disposed outside the surface plate 18.

The laser tracker body 55M faces the reflector 55R. The laser tracker body 55M emits laser light to the reflector 55R and receives the laser light reflected by the reflector 55R (reflected light) so as to detect a change in a relative position between the end effector EE and the surface plate 18 (a displacement of the reflector 55R). The principle and a configuration of the laser tracker are generally known, and therefore, detailed descriptions thereof are omitted.

Furthermore, a laser tracker serving as the surface-plate vibration detecting means 56 includes a plurality of reflectors 56R disposed on side surfaces of the surface plate 18 in the X and Y directions and a plurality of laser tracker bodies 56M facing the respective reflectors 56R. The laser tracker bodies 56M are preferably disposed outside the surface plate 18.

The individual laser tracker bodies 56M emit laser light to the respective reflectors 56R that face the laser tracker bodies 56M and receive laser light reflected by the reflectors 56R (reflected light) so as to detect a change of a relative position between the end effector EE and the surface plate 18 (a displacement of the reflectors 56R).

Although the number of laser trackers may be one in the surface-plate vibration detecting means 56, a change of a relative position of the surface plate 18 (a displacement of the reflector 56R) is preferably detected by a plurality of laser trackers when the surface plate 18 is comparatively large.

Furthermore, inclination detecting means (not illustrated) for detecting an inclination (a change in an attitude) of the surface plate 18 may be disposed on the three-dimensional measuring machine 2 in addition to the surface-plate vibration detecting means 56. Examples of the inclination detecting means include an inclination sensor, an acceleration sensor, and a gyroscope sensor.

In this case, the vibration correcting means 31 corrects a measured value of the three-dimensional measurement performed on the workpiece W in real time, for example, based on vibrations of the surface plate 18 in the individual directions detected by the surface-plate vibration detecting means 56 and an inclination of the surface plate 18 detected by the inclination detecting means. By this, accuracy of the three-dimensional measurement can be further improved.

Note that the inclination detecting means may be disposed instead of the surface-plate vibration detecting means 56.

Figure 17:
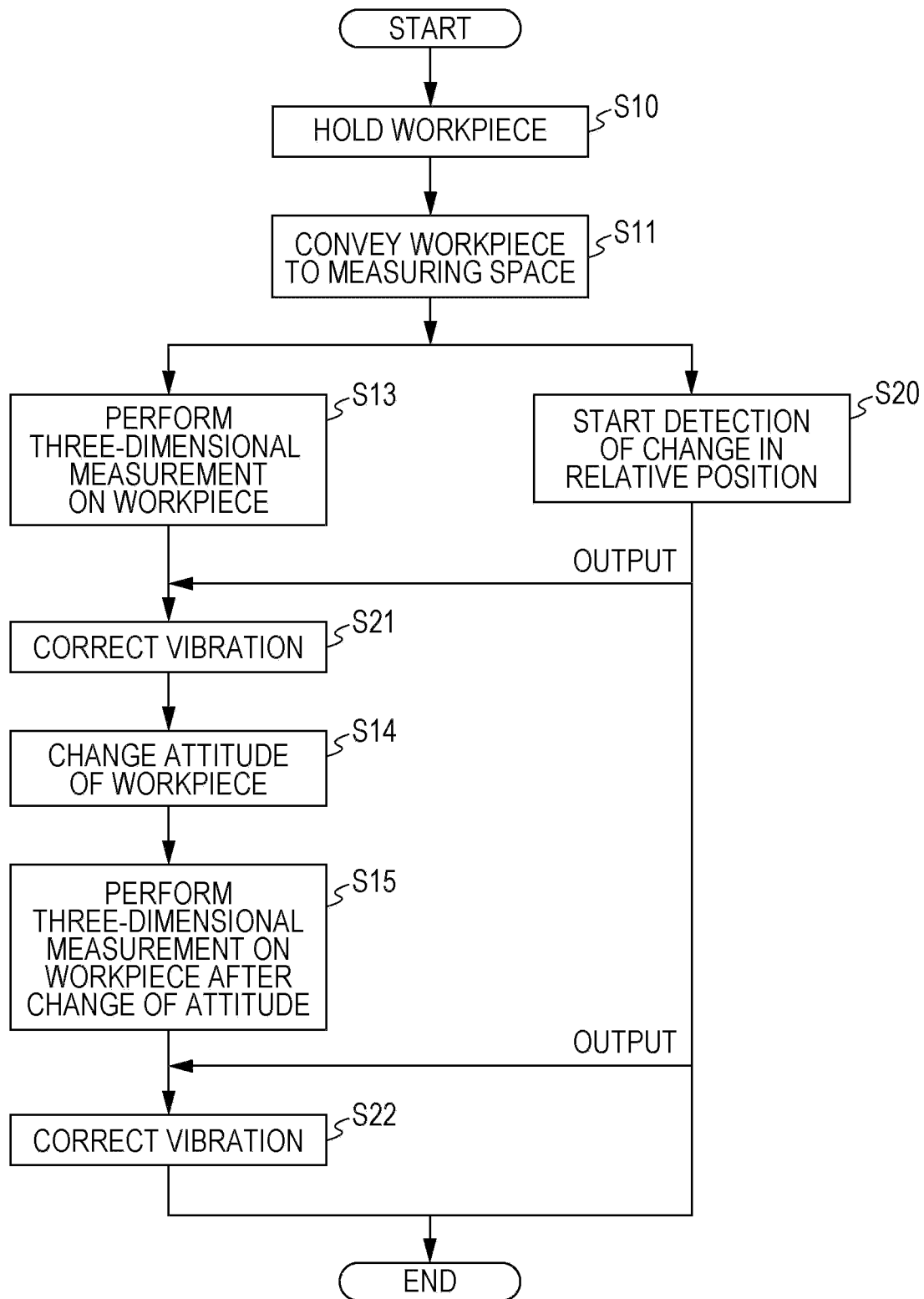
FIG. 17 is a flowchart of a three-dimensional measuring method according to the third embodiment.

FIG. 17 is a flowchart of a three-dimensional measuring method according to the third embodiment. In FIG. 17, steps the same as those in the flowchart of FIG. 4 are designated by reference numerals the same as those in FIG. 4, and descriptions of the same steps are omitted.

As illustrated in FIG. 17, since the robot base 53 is disposed on the surface plate 18 also in the third embodiment similarly to the second embodiment, a step of causing a portion of the robot arm 50 to directly or indirectly abut on the surface plate 18 (step S12 in FIG. 4, for example) may be omitted.

In the third embodiment, when the workpiece W is conveyed to a measuring space (step S11), the relative-position change detecting means (that is, the arm vibration detecting means 55 and/or the surface-plate vibration detecting means 56) starts detection of a change in a relative position between the surface plate 18 and the robot arm 50 (step S20) and outputs a result of the detection to the vibration correcting means 31 in real time, for example. Every time the three-dimensional measurement is performed (step S13 and step S15), the vibration correcting means 31 corrects a measured value of the three-dimensional measurement based on the result of the detection output from the relative-position change detecting means (step S21 and step S22).

More specifically, when the three-dimensional measuring system 3000 includes the arm vibration detecting means 55 and the surface-plate vibration detecting means 56, for example, the vibration correcting means 31 corrects a measured value of the three-dimensional measurement performed on the workpiece W such that vibration of the surface plate 18 is cancelled by vibration of the robot arm 50.

Since the robot base 53 is disposed on the surface plate 18 in this embodiment as described above, the robot arm apparatus 300 is hardly affected by vibration of an outside environment. Furthermore, even when an attitude of the surface plate 18 is changed due to a movement of a gate, the robot arm apparatus can follow the change in the attitude of the surface plate 18. However, since the three-dimensional measurement is performed in a state in which the end effector EE holds the workpiece W even in this case, vibration of the robot arm 50 itself may affect a measured value of the three-dimensional measurement.

Therefore, the influence of the vibration of the robot arm 50 itself is suppressed by correcting a measuring result of the three-dimensional measurement based on a change in a relative position between the surface plate 18 and the robot arm 50 in step S21 and step S22. Accordingly, accuracy of the three-dimensional measurement can be further improved.

Figure 18:
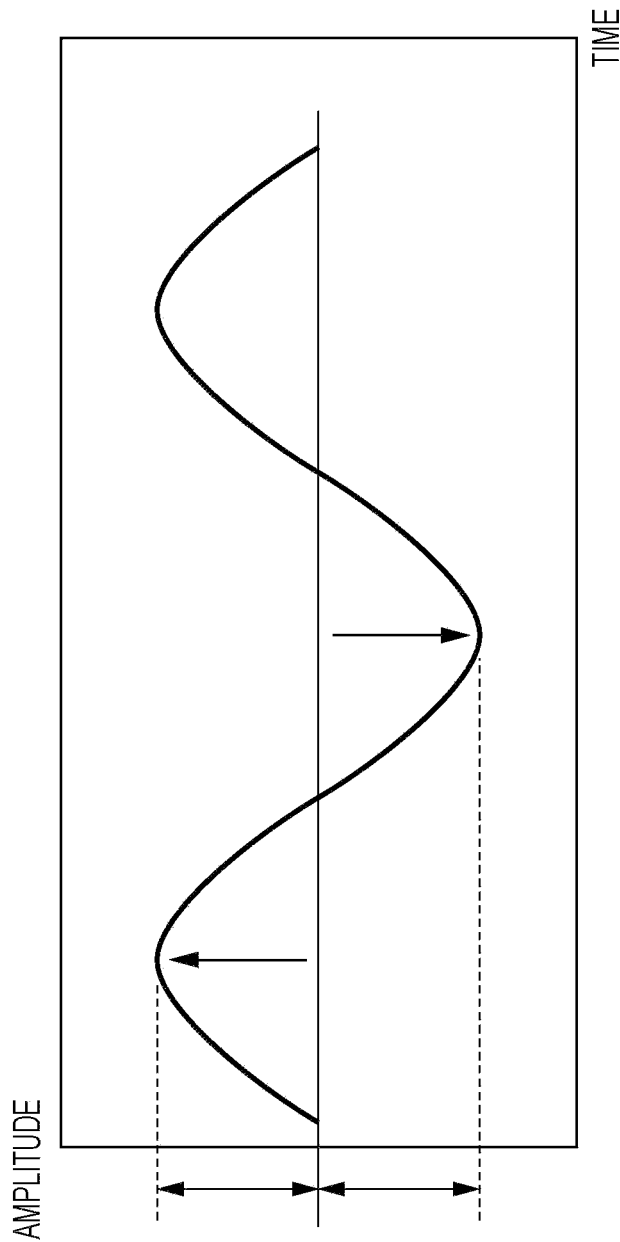
FIG. 18 is an example graph indicating a temporal change of a relative position detected by the relative-position change detecting means.

Here, the correction of a measured value of the three-dimensional measurement based on a result of detection of a change in a relative position is described in detail. It is assumed, for the sake of explanation, that the relative-position change detecting means detects a temporal change in relative positions of the robot arm 50 in the X, Y, and Z directions. In this case, a waveform illustrated in FIG. 18 is obtained in the individual X, Y, and Z directions. FIG. 18 is an example graph indicating a temporal change of a relative position in one direction detected by the relative-position change detecting means, in which a horizontal axis of the graph denotes time and a vertical axis of the graph denotes a change amount (amplitude) of a relative position.

The vibration correcting means 31 calculates amplitudes in the individual directions based on the waveform illustrated in FIG. 18 so as to correct a measured value of the three-dimensional measurement performed on the workpiece W based on the calculated amplitudes. More specifically, the vibration correcting means 31 adds values corresponding to the amplitudes detected by the relative-position change detecting means to a measured value (a measured coordinates) of the three-dimensional measurement in the individual X, Y, and Z directions or subtracts values corresponding to the amplitudes from the measured value of the three-dimensional measurement so that influence of the change in the relative position is cancelled. The addition or the subtraction to be performed is determined based on a direction of the change in the relative position.

In this way, a shift of a measured point generated due to vibration of the robot arm 50 at the time of the three-dimensional measurement can be corrected. Accordingly, accuracy of the three-dimensional measurement can be further improved.

{First Modification of Third Embodiment}

As with the modification of the second embodiment, a portion of the robot arm 50 may directly or indirectly abut on the surface plate 18 at a time of measurement also in the third embodiment. In a modification of the third embodiment, for example, a step of causing a portion of the robot arm 50 to directly or indirectly abut on the surface plate 18 at a time of measurement (step S12 in FIG. 4, for example) may be added between step S1*l* and step S13 in the measuring method according to the third embodiment illustrated in FIG. 17. This enables reduction of the vibration of the robot arm 50 itself, and therefore, measuring accuracy can be further improved.

{Second Modification of Third Embodiment}

In addition to the surface-plate vibration detecting means 56, inclination detecting means (not illustrated) for detecting an inclination of the surface plate 18 may be included in the three-dimensional measuring machine 2. Examples of the inclination detecting means include an inclination sensor, an acceleration sensor, and a gyroscope sensor.

The vibration correcting means 31 corrects a measured value of the three-dimensional measurement performed on the workpiece W in real time, for example, based on vibrations of the surface plate 18 in the individual directions detected by the surface-plate vibration detecting means 56 and an inclination of the surface plate 18 detected by the inclination detecting means. By this, accuracy of the three-dimensional measurement can be further improved.

Note that the inclination detecting means may be disposed instead of the surface-plate vibration detecting means 56.

Fourth Embodiment

Figure 19:
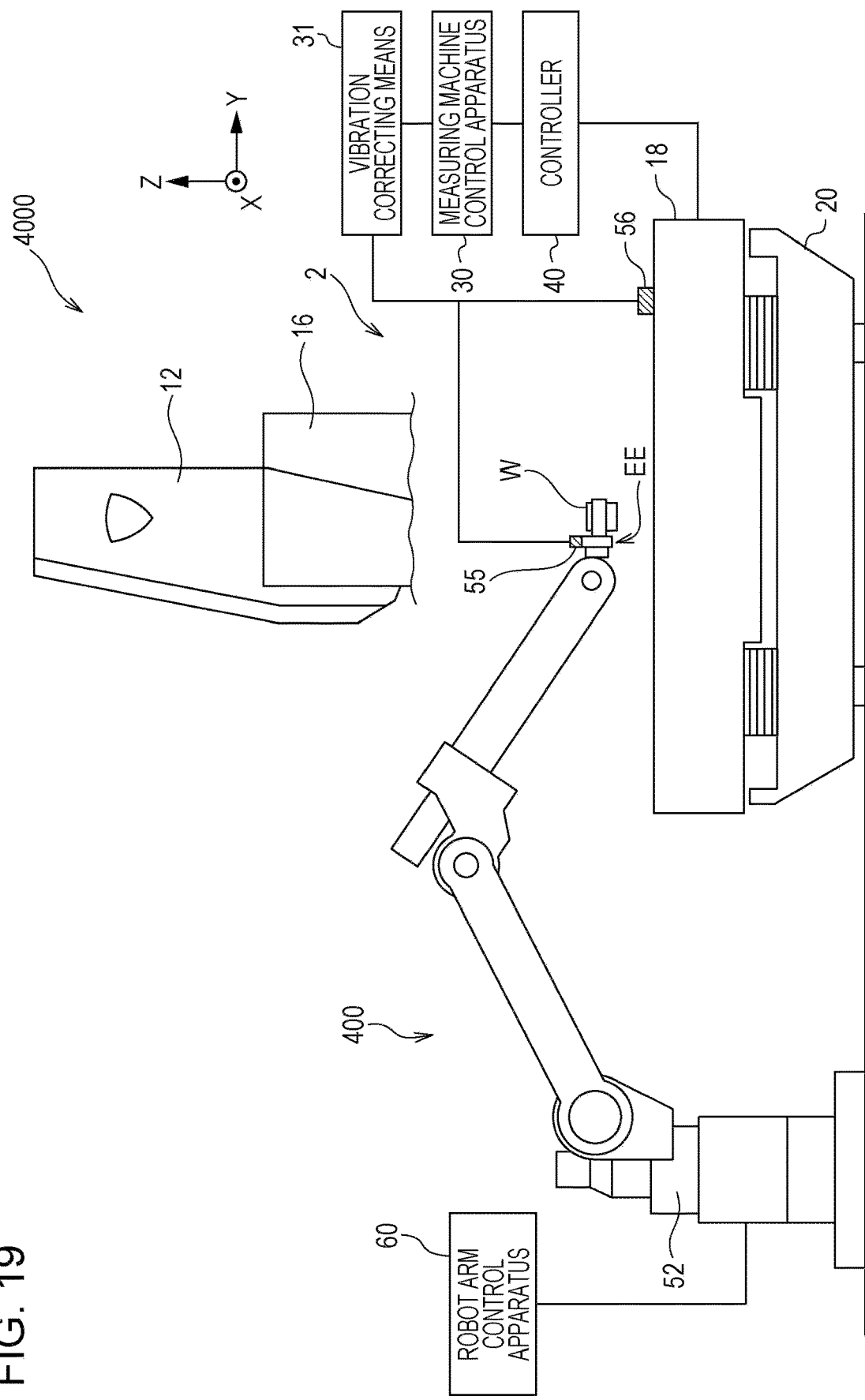
FIG. 19 is a diagram schematically illustrating a configuration of a three-dimensional measuring system according to a fourth embodiment.

Next, a three-dimensional measuring system 4000 according to a fourth embodiment is described. FIG. 19 is a diagram schematically illustrating a configuration of the three-dimensional measuring system 4000 according to the fourth embodiment. As illustrated in FIG. 19, the three-dimensional measuring system 4000 according to the fourth embodiment includes a three-dimensional measuring machine 2 and a robot arm apparatus 400. The robot arm apparatus 400 is constituted by replacing the robot base 53 of the robot arm apparatus 300 of the third embodiment with a robot base 52. The three-dimensional measuring machine 2 is basically the same as the three-dimensional measuring machine 2 according to the third embodiment.

A three-dimensional measuring method according to the fourth embodiment is basically the same as that of the third embodiment, and therefore, a description thereof is omitted. Also in the fourth embodiment, an attitude of a workpiece can be easily changed since three-dimensional measurement can be performed while the workpiece is held by an end effector EE of a robot arm 50.

The robot base 52 is disposed outside the surface plate 18 in the fourth embodiment, and therefore, a vibration system of the three-dimensional measuring machine 2 and a vibration system of the robot arm apparatus 400 are different from each other similarly to the first embodiment. However, influence of vibration of the robot arm 50 and/or influence of vibration of the surface plate 18 can be reduced since relative-position change detecting means (that is, arm vibration detecting means 55 and/or surface-plate vibration detecting means 56) and vibration correcting means 31 are provided. Accordingly, as with the third embodiment, a portion of the robot arm 50 may not directly or indirectly abut on the surface plate 18 unlike the first embodiment.

Since the robot base 52 is not required to be disposed on the surface plate 18 in the three-dimensional measuring system 4000 according to the fourth embodiment, a larger robot arm apparatus can be used as the robot arm apparatus 400 when compared with the third embodiment.

{First Modification of Fourth Embodiment}

As with the first embodiment and the modification of the first embodiment, a portion of the robot arm 50 may directly or indirectly abut on the surface plate 18 at a time of measurement also in the fourth embodiment. A three-dimensional measuring method according to the fourth embodiment is basically the same as that of the modification of the third embodiment, and therefore, a description thereof is omitted. Also in the modification of the fourth embodiment, the vibration of the robot arm 50 itself can be reduced, and therefore, accuracy of the three-dimensional measurement performed on the workpiece W can be further improved.

{Second Modification of Fourth Embodiment}

As with the second modification of the third embodiment, inclination detecting means (not illustrated) for detecting an inclination of the surface plate 18 may be included in the three-dimensional measuring machine 2 in addition to the surface-plate vibration detecting means 56. By this, also in a second modification of the fourth embodiment, the vibration correcting means 31 can correct a measured value of the three-dimensional measurement performed on the workpiece W in real time, for example, based on vibrations of the surface plate 18 in the individual directions detected by the surface-plate vibration detecting means 56 and an inclination of the surface plate 18 detected by the inclination detecting means, and accordingly, accuracy of the three-dimensional measurement can be further improved. Note that the inclination detecting means may be disposed instead of the surface-plate vibration detecting means 56.

Fifth Embodiment

Figure 20:
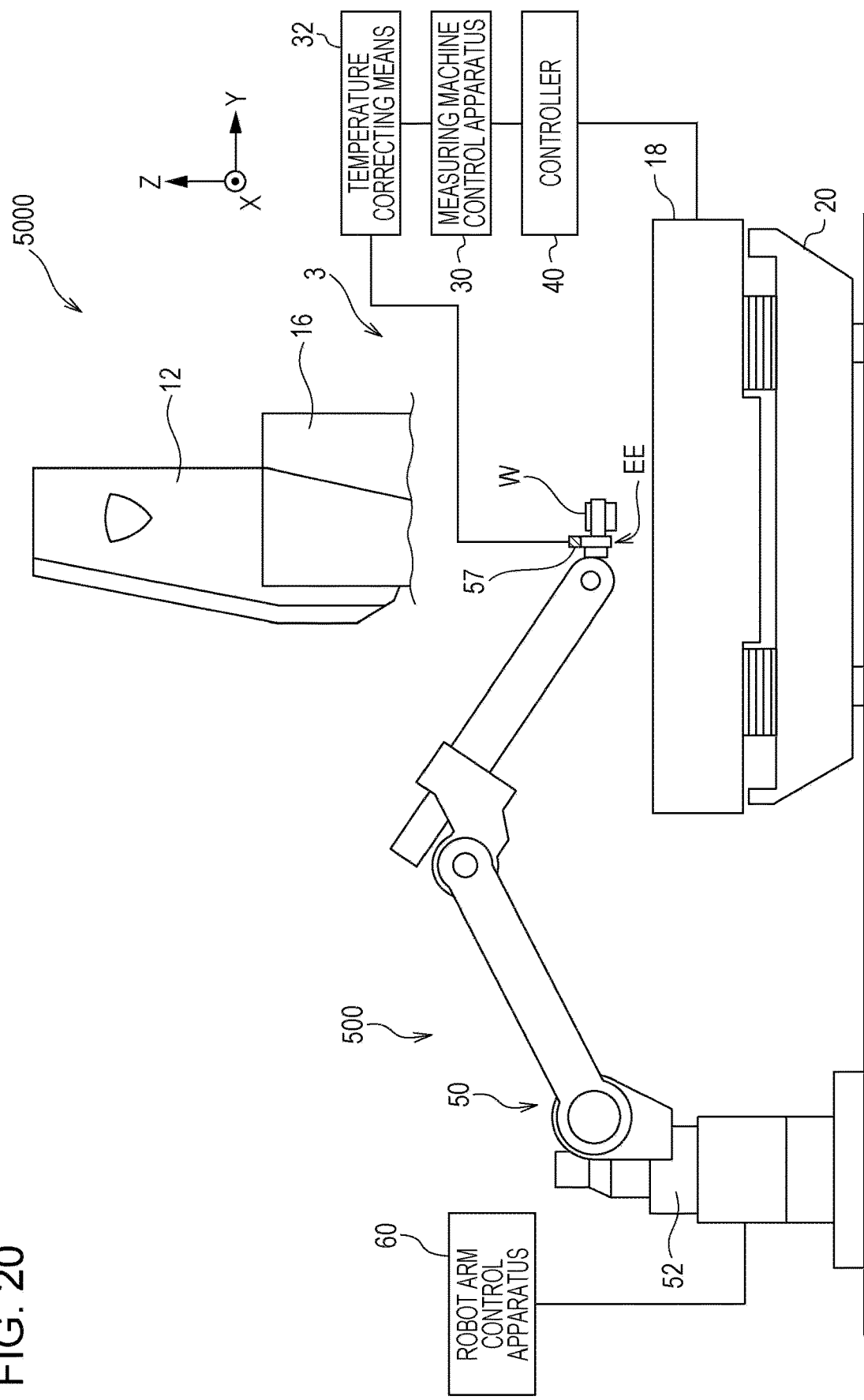
FIG. 20 is a diagram schematically illustrating a configuration of a three-dimensional measuring system according to a fifth embodiment.

Next, a three-dimensional measuring system 5000 according to a fifth embodiment is described. FIG. 20 is a diagram schematically illustrating a configuration of the three-dimensional measuring system 5000 according to the fifth embodiment. As illustrated in FIG. 20, the three-dimensional measuring system 5000 according to the fifth embodiment includes a three-dimensional measuring machine 3 and a robot arm apparatus 500.

The robot arm apparatus 500 is constituted by adding temperature detecting means 57 to the robot arm apparatus 100 according to the first embodiment. The three-dimensional measuring machine 3 is constituted by adding temperature correcting means (correcting means) 32 to the three-dimensional measuring machine 1 according to the first embodiment.

As with the first embodiment, an attitude of a workpiece can be easily changed since three-dimensional measurement can be performed while the workpiece is held by an end effector EE of a robot arm 50 also in the fifth embodiment.

As the temperature detecting means 57, an arbitrary type of temperature sensor can be used. Examples of the temperature detecting means 57 include a thermocouple thermometer, a resistance thermometer, an infrared thermometer, and a bimetal thermometer.

Although the temperature detecting means 57 may be disposed in any position in the robot arm apparatus 500 as long as the temperature detecting means 57 can detect a temperature of the workpiece W held by the end effector EE, the temperature detecting means 57 is preferably disposed on a holding surface of the end effector EE for holding (grasping) the workpiece W. Accordingly, a temperature of the workpiece W held by the end effector EE can be detected with high accuracy.

In the three-dimensional measuring machine 3, the temperature correcting means 32 determines whether the three-dimensional measurement is to be performed based on the temperature of the workpiece W detected by the temperature detecting means 57. Furthermore, the temperature correcting means 32 corrects a measured value of the three-dimensional measurement based on the detected temperature of the workpiece W.

Next, an example of the end effector EE including the temperature detecting means 57 is described with reference to FIGS. 21 and 22. The end effector EE is appropriately changed depending on a shape and material of the workpiece W.

FIG. 21 is a diagram illustrating an example of the end effector EE that can be suitably used when a rectangular workpiece W is held. A reference numeral 21A in FIG. 21 designates a front view of the end effector EE and a reference numeral 21B designates a diagram illustrating a holding surface. As designated by the reference numeral 21A, the end effector EE includes a base portion 71 and a pair of claw portions 72. The base portion 71 is coupled with a first arm A1 of the robot arm 50 on a base end side of the base portion 71. The pair of claw portions 72 is disposed on the base portion 71 on a tip end side of the base portion 71. The pair of claw portions 72 is movable so as to be separated from each other and close to each other, and the workpiece W is held in a gap of the pair of claw portions 72 as designated by a reference numeral 21C. Specifically, portions that face each other in the pair of claw portions 72 form a pair of holding surfaces 73 for holding the workpiece W.

As designated by the reference numeral 21B, the temperature detecting means 57 is disposed on at least one of the holding surfaces 73. When the workpiece W is held by the end effector EE, the workpiece W is brought into contact with the temperature detecting means 57 disposed on at least one of the holding surfaces 73 and the temperature detecting means 57 starts detection of a temperature of the workpiece W. Preferably, the temperature detecting means 57 is disposed on all the holding surfaces 73. In this way, temperature measuring accuracy can be improved.

FIG. 22 is a diagram illustrating an example of an end effector EE that can be suitably used when a cylindrical workpiece W is held. A reference numeral 22A in FIG. 22 designates a front view of the end effector EE and a reference numeral 22B designates a bottom view. As designated by the reference numerals 22A and 22B, the end effector EE includes a base portion 75 and a set of three chucks 76. The base portion 75 is coupled with a first arm A1 of the robot arm 50 on a base end side of the base portion 75. The set of chucks 76 is disposed on the base portion 75 on a tip end side of the base portion 75. The set of chucks 76 is concyclic at an interval of 120 degrees and the chucks 76 can be individually moved in a radial direction. As designated by a reference numeral 22C, the workpiece W is held in a gap formed by the set of chucks 76. Specifically, surfaces of the set of chucks 76 on a center side in the radial direction constitute a set of holding surfaces 77 for holding the workpiece W.

As designated by the reference numeral 22B, the temperature detecting means 57 is disposed on at least one of the holding surfaces 77. Preferably, the temperature detecting means 57 is disposed on all the holding surfaces 77.

Figure 23:
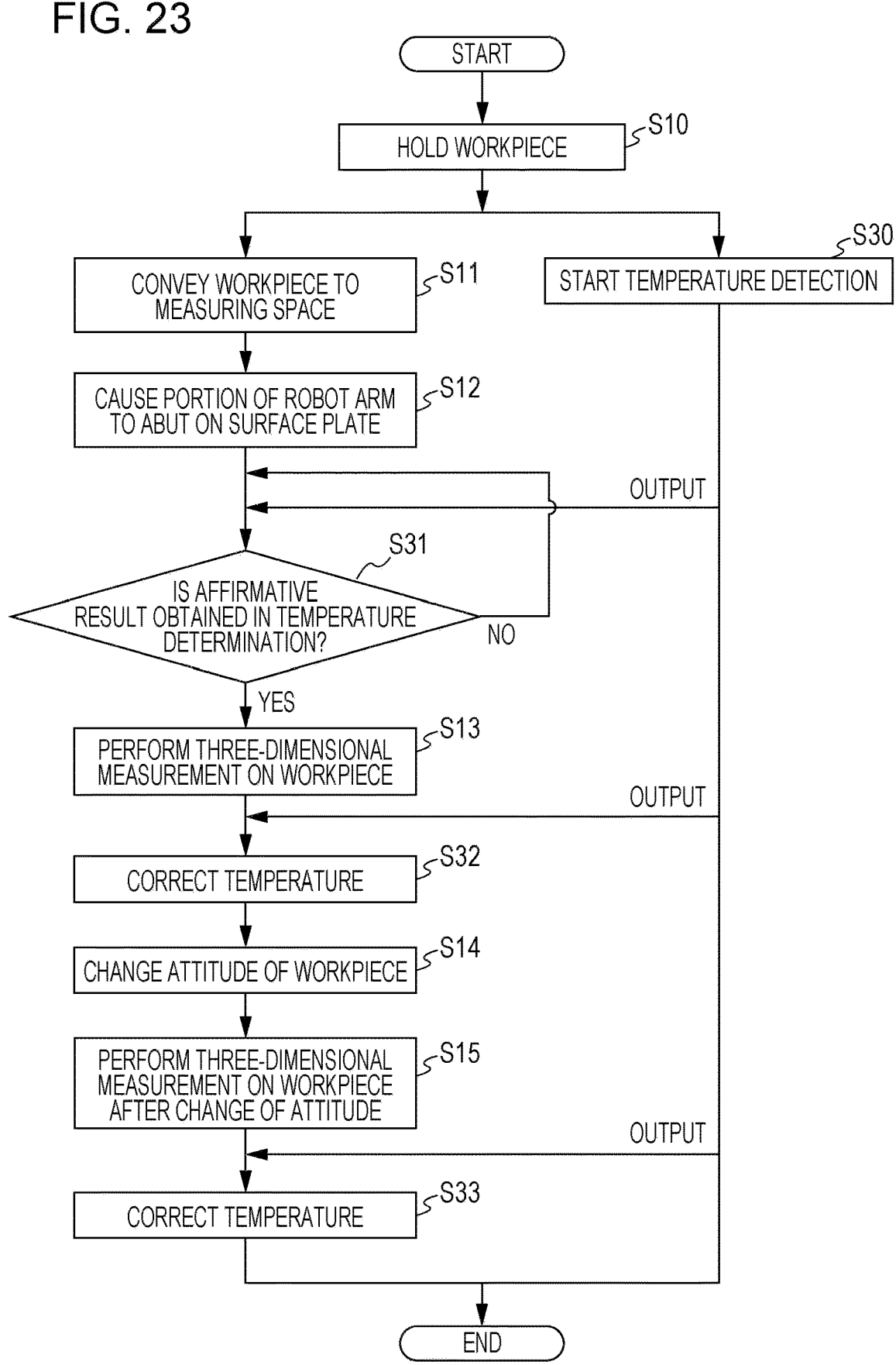
FIG. 23 is a flowchart of a three-dimensional measuring method according to the fifth embodiment.

FIG. 23 is a flowchart of a three-dimensional measuring method according to the fifth embodiment. In FIG. 23, steps the same as steps in the flowchart of FIG. 4 are designated by the reference numerals the same as those in FIG. 4, and descriptions of the same steps are omitted. As is apparent from FIG. 23, the three-dimensional measuring method according to the fifth embodiment is obtained by adding step S30 to step S33 to the three-dimensional measuring method according to the first embodiment. Note that, although a portion of the robot arm 50 directly abuts on the surface plate 18 in the first embodiment (step S12, for example), as with the modification of the first embodiment, obviously, a portion of the robot arm 50 may indirectly abut on the surface plate 18.

In the fifth embodiment, when the end effector EE holds the workpiece W (step S10), the workpiece W and the temperature detecting means 57 are brought into contact with each other and the temperature detecting means 57 starts detection of a temperature of the workpiece W (step S30: a temperature detecting step). Thereafter, the temperature detecting means 57 outputs a result of the detection of the temperature to the temperature correcting means 32 at a regular interval, at an irregular interval, or in real time in parallel to a process from step S11 to step S33.

Here, when the temperature detecting means 57 does not automatically output the result of the detection of the temperature to the temperature correcting means 32, the temperature correcting means 32 may transmit a signal for instructing an output of the result of the detection of the temperature to the temperature detecting means 57, for example, after an attitude of the workpiece W is set (step S12).

In this way, since the temperature detecting means 57 can automatically start the detection of a temperature of the workpiece W at a timing when the end effector EE holds the workpiece W, the process of attaching a sensor for detecting a temperature of the workpiece W to the robot arm 50 or the like to be performed by the user may be omitted. Furthermore, the detection of a temperature of the workpiece W is started in a state in which the end effector EE holds the workpiece W, and therefore, the detection of a temperature of the workpiece W can be performed in a period of time from when the workpiece W is held (step S10: the holding step) to when the workpiece W is mounted (step S12). This is considerably advantageous when a comparatively long period of time is required for activation of the temperature detecting means 57. Accordingly, efficiency of the three-dimensional measurement can be improved.

When a measuring attitude of the workpiece W is determined by causing a portion of the robot arm 50 to directly or indirectly abut on the surface plate 18 (step S12), the temperature correcting means 32 of the three-dimensional measuring machine determines whether a temperature of the workpiece W detected by the temperature detecting means 57 satisfies a predetermined temperature condition (step S31: a temperature determining step).

Here, the temperature condition is set in advance based on a temperature range of the workpiece W that can be measured by the three-dimensional measuring machine 3, for example. When a temperature of atmosphere in the three-dimensional measurement is 20 degrees Celsius, the predetermined temperature condition may be set to 20±2 degrees Celsius or 20±1 degrees Celsius.

When it is determined that a temperature of the workpiece W does not satisfy the predetermined temperature condition (step S31: No), a result of the determination is transmitted to the user (not illustrated) and the temperature determination is performed again based on a temperature newly detected after a predetermined period of time has elapsed. When it is determined that a temperature of the workpiece W is suitable for measurement to be performed on the workpiece W (step S31: Yes), the three-dimensional measurement is performed on the workpiece W (step S13).

Subsequently, the temperature correcting means 32 corrects a measured value of the three-dimensional measurement performed on the workpiece W based on a result of the detection of the temperature of the workpiece W output from the temperature detecting means 57 during the three-dimensional measurement performed on the workpiece W (step S32). Here, when the temperature detecting means 57 detects a temperature in real time and the value of the detected temperature is output to the temperature correcting means 32 in real time, a measured value of the three-dimensional measurement may be corrected in real time.

When the three-dimensional measurement in the attitude determined in step S12 is terminated, the robot arm 50 changes the attitude of the workpiece W (step S14). Subsequently, the three-dimensional measurement (step S15) is similarly performed on the workpiece after the change of the attitude, and a measured value of the three-dimensional measurement is corrected based on the detected temperature (step S32).

In this way, by correcting the measured value of the three-dimensional measurement based on the temperature of the workpiece W, accuracy of the three-dimensional measurement performed on the workpiece W can be improved. Here, it is determined whether the workpiece W satisfies the predetermined temperature condition in the foregoing description (step S31 in FIG. 23). However, when it is known in advance that the workpiece W satisfies the predetermined temperature condition, step S31 in FIG. 23 may be omitted. In this way, efficiency of the three-dimensional measurement can be further improved.

{First Modification of Fifth Embodiment}

Next, a first modification of the fifth embodiment is described. Although a workpiece W that is determined that the temperature condition is not satisfied in the temperature determination is not moved in the fifth embodiment, a workpiece W that is determined that the temperature condition is not satisfied is moved to a temperature pre-conditioning area, for example, in the first modification of the fifth embodiment.

According to the first modification of the fifth embodiment, a workpiece stocker storing the workpiece W and a place where the workpiece W that does not satisfy the predetermined temperature condition is temporarily stored (the temperature pre-conditioning area) are provided in advance (not illustrated) in the vicinity of the three-dimensional measuring system 5000. A configuration of the three-dimensional measuring system according to the first modification of the fifth embodiment is the same as that of the three-dimensional measuring system 5000 according to the fifth embodiment, and therefore, a description of a system configuration is omitted.

Figure 24:
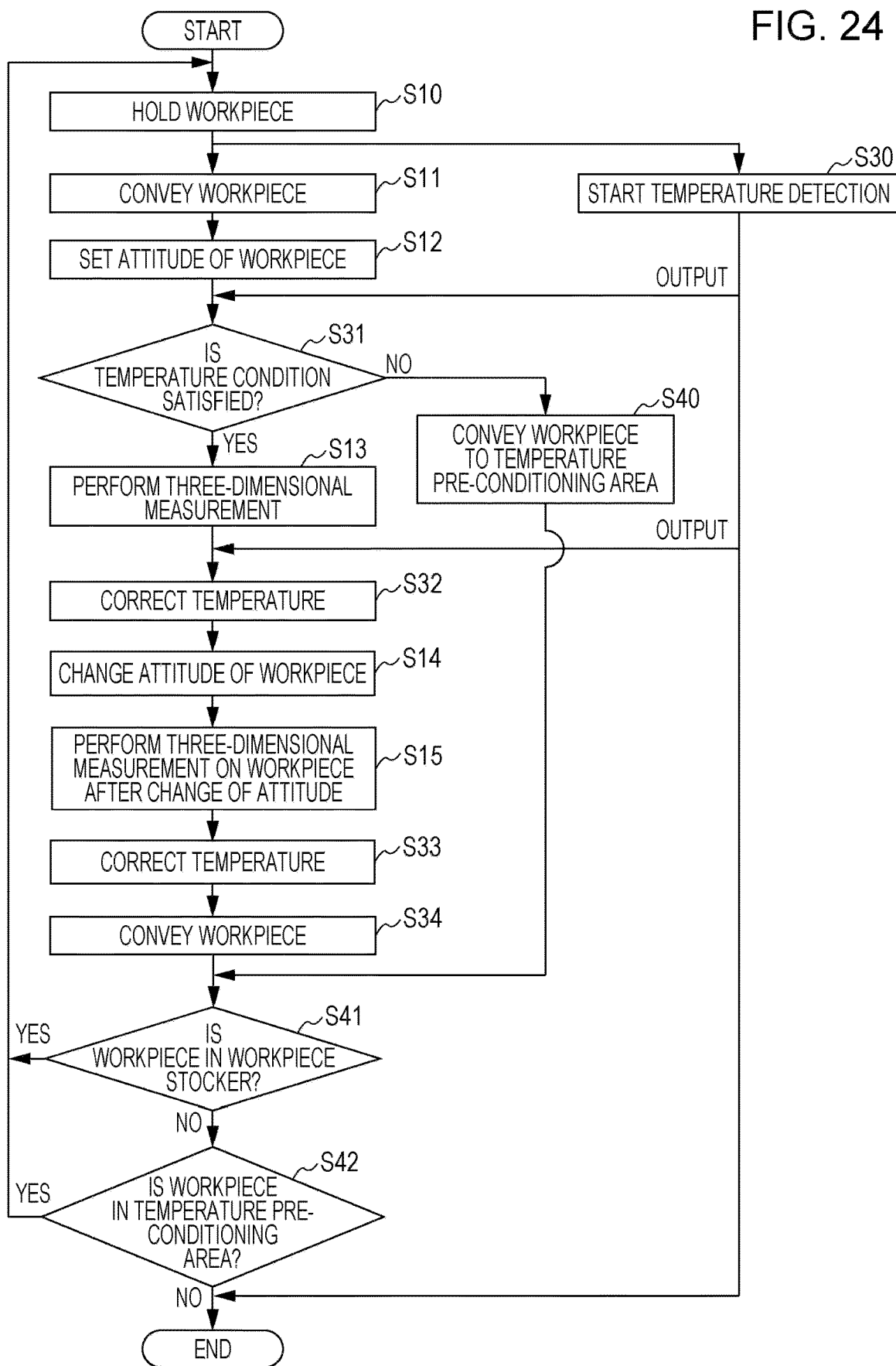
FIG. 24 is a flowchart of a three-dimensional measuring method according to a first modification of the fifth embodiment.

FIG. 24 is a flowchart of a three-dimensional measuring method according to the first modification of the fifth embodiment. As illustrated in FIG. 24, in the first modification of the fifth embodiment, step S40 is added, when it is determined that the predetermined temperature condition is not satisfied in step S31, to the flowchart of the three-dimensional measuring method according to the fifth embodiment illustrated in FIG. 23, and step S34, step S41, and step S42 are added after step S33. Other steps are basically the same as those of the fifth embodiment, and therefore, descriptions thereof are omitted.

In the first modification of the fifth embodiment, when it is determined that a result of the detection of a temperature of the workpiece W satisfies the predetermined temperature condition (Yes in step S31), the workpiece W is conveyed out of the three-dimensional measuring machine 3 (step S34) after the three-dimensional measurement and the temperature correction are performed on the workpiece W similarly to the fifth embodiment, and thereafter, the process proceeds to step S41.

On the other hand, when it is determined that the result of the detection of the temperature of the workpiece W does not satisfy the predetermined temperature condition (No in step S31), the process proceeds to step S41 after the workpiece W held by the end effector EE is moved to the temperature pre-conditioning area (step S40: a conveying step).

According to the first modification of the fifth embodiment, a temperature can be determined in a state in which the workpiece W is held, and the workpiece W that does not satisfy the temperature condition can be quickly conveyed out of the three-dimensional measuring machine 3 without detaching the workpiece W from the end effector EE once. In this way, an operation rate of the three-dimensional measuring machine 3 can be improved.

Subsequently, in step S41, it is determined whether the workpiece stocker includes another workpiece. When it is determined that the workpiece stocker includes another workpiece (Yes in step S41), the process returns to step S10 and the process in step S10 onwards is performed on the other workpiece W included in the workpiece stocker.

When it is determined that the workpiece stocker does not include another workpiece (No in step S41), it is determined whether another workpiece is in the temperature pre-conditioning area (step S42). When it is determined that another workpiece is in the temperature pre-conditioning area (Yes in step S42), the process returns to step S10 and the process in step S10 onwards is performed on the other workpiece W in the temperature pre-conditioning area. When it is determined that another workpiece is not in the temperature pre-conditioning area (No in step S42), the process is terminated.

Obviously, the first modification of the fifth embodiment can attain the same effects as the fifth embodiment. Furthermore, the workpiece W determined that the predetermined temperature condition is not satisfied is temporarily moved to the temperature pre-conditioning area in step S40 according to the first modification of the fifth embodiment. Then after the three-dimensional measurement is performed on the other workpiece W obtained from the workpiece stocker, the three-dimensional measurement is performed on the workpiece W which has been subjected to the temperature pre-conditioning (the temperature pre-conditioning is completed) in the temperature-preconditioning area. In this way, an operation rate of the three-dimensional measuring machine 3 can be improved.

{Second Modification of Fifth Embodiment}

In the fifth embodiment described above, the temperature detecting means 57 and the temperature correcting means 32 are added to the robot arm apparatus 100 and the three-dimensional measuring machine 1 according to the first embodiment, respectively. However, the temperature detecting means 57 and the temperature correcting means 32 may be added to the three-dimensional measuring systems 2000 and 3000 including the robot base 53 disposed on the surface plate 18 according to the second and third embodiments instead of the robot base 52 disposed outside the surface plate 18.

The three-dimensional measuring method according to the second modification of the fifth embodiment is obtained by removing the step (step S12) of causing a portion of the robot arm 50 to directly or indirectly abut on the surface plate 18 from the flowcharts in FIGS. 23 and 24. Specifically, when the second modification of the fifth embodiment is applied to the fifth embodiment and the first modification of the fifth embodiment described above, in addition to the effects of the fifth embodiment and the first modification of the fifth embodiment described above, the effects of the second and third embodiments in which influence of vibration in an outside environment can be reduced and followability to a change in an attitude of the surface plate 18 can be ensured although the robot arm 50 does not directly or indirectly abut on the surface plate 18 can be attained.

{Third Modification of Fifth Embodiment}

A configuration of a three-dimensional measuring system according to a third modification of the fifth embodiment is the same as that of the three-dimensional measuring system 5000 according to the fifth embodiment, and therefore, a description of a system configuration is omitted.

Figure 25:
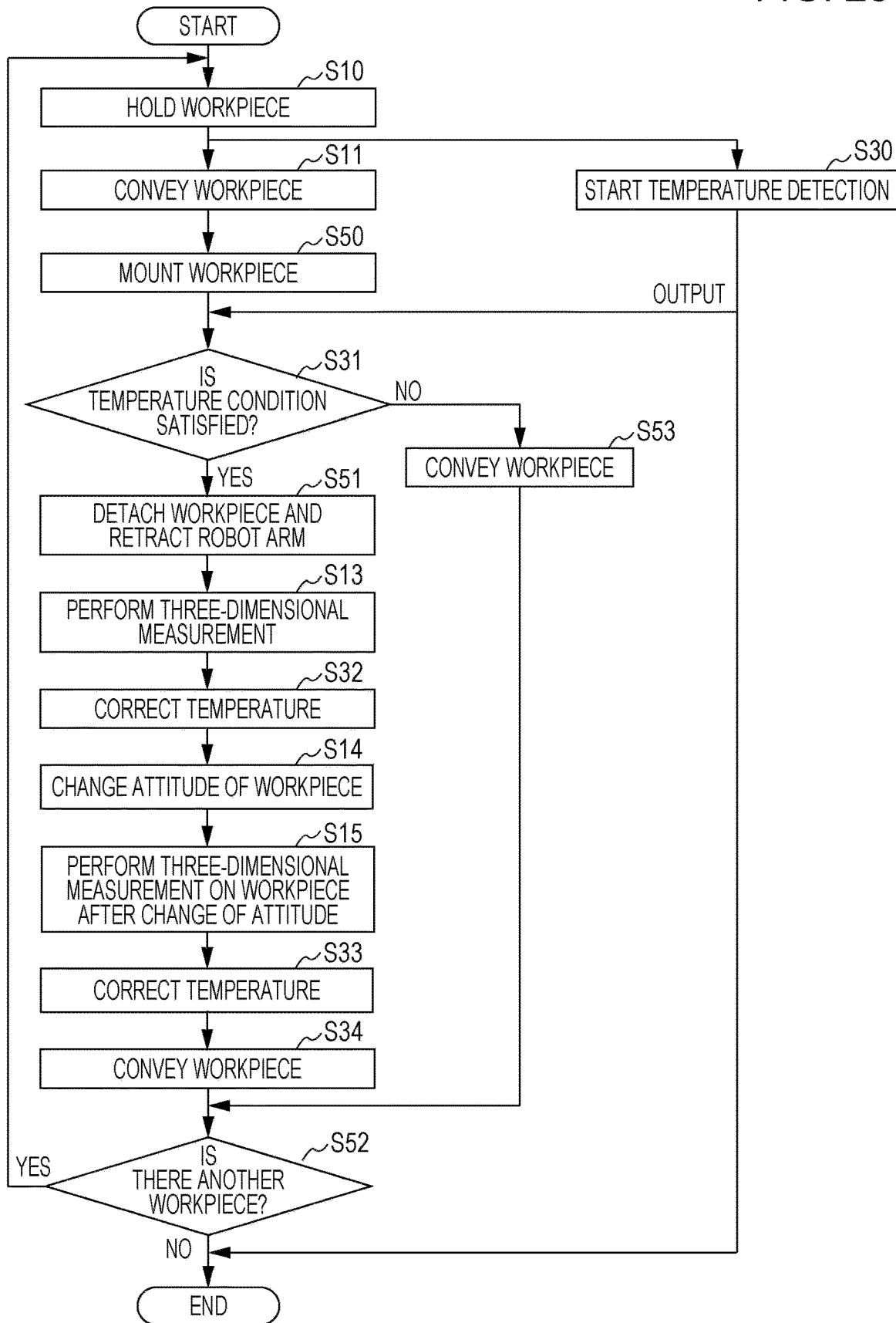
FIG. 25 is a flowchart of a three-dimensional measuring method according to a third modification of the fifth embodiment.

FIG. 25 is a flowchart of a three-dimensional measuring method according to the third modification of the fifth embodiment. As illustrated in FIG. 25, according to the third modification of the fifth embodiment, step S12 in the flowchart of the three-dimensional measuring method according to the fifth embodiment illustrated in FIG. 23 is replaced with step S50. Furthermore, step S51 is added when it is determined that the predetermined temperature condition is satisfied in step S31, and step S34 and step S52 are added after step S33. Moreover, step S53 is added when it is determined that the predetermined temperature condition is not satisfied in step S31. Other steps are basically the same as those of the fifth embodiment, and therefore, descriptions thereof are omitted.

The three-dimensional measurement is performed in a state in which the workpiece W is held by the end effector EE in the fifth embodiment and the first and second modifications of the fifth embodiment. On the other hand, in the third modification of the fifth embodiment, the three-dimensional measurement is performed in a state in which the workpiece W is mounted on the surface plate 18 and the workpiece W is detached from the end effector EE.

Therefore, in the third modification of the fifth embodiment, after the workpiece W is conveyed to the three-dimensional measurement 3 in step S11 (step S11), the workpiece W is mounted on the surface plate 18 so as to be disposed in a predetermined measuring position in a measuring space (step S50). Here, the workpiece W may be directly mounted on the surface plate 18 or indirectly mounted on the surface plate 18 through a jig (not illustrated).

After the workpiece W is mounted in step S50, the workpiece W is preferably held by the end effector EE until at least a result of the detection of the temperature is output. This is because, when the end effector EE releases the workpiece W, the temperature detecting means 57 disposed on the end effector EE is exposed in an outside air, and therefore, a temperature of the workpiece W may not be appropriately measured.

After step S50, when the temperature detecting means 57 outputs the result of the detection of the temperature of the workpiece W to the temperature correcting means 32, the temperature correcting means 32 determines whether the result of the detection of the temperature of the workpiece W satisfies the predetermined temperature condition (step S31). Note that, when it is known in advance that the workpiece W satisfies the predetermined temperature condition, step S31 may be omitted, for example. In this way, efficiency of the three-dimensional measurement can be further improved.

When it is determined that the result of the detection of the temperature of the workpiece W does not satisfy the predetermined temperature condition (No in step S31), information on the fact is transmitted to the user (not illustrated). Subsequently, after the end effector EE moves the workpiece W held by the end effector EE from a measuring position to a predetermined position outside the three-dimensional measuring machine 3 (step S53: a conveying step), the process proceeds to step S52.

Since the temperature can be determined in the state in which the workpiece W is held, the workpiece W that does not satisfy the temperature condition can be quickly conveyed out of the three-dimensional measuring machine 3 without detaching the workpiece W from the end effector EE once. In this way, an operation rate of the three-dimensional measuring machine 3 can be improved.

When it is determined that the result of the detection of the temperature of the workpiece W satisfies the predetermined temperature condition (Yes in step S31), the workpiece W is detached from the end effector EE and the robot arm 50 is retracted (step S51). Subsequently, the three-dimensional measurement is performed on the workpiece W similarly to the fifth embodiment, and furthermore, temperature correction is performed based on the temperature used in the temperature determination performed in step S31.

Note that, when a change in an attitude of the workpiece W is required at a time of the three-dimensional measurement, the end effector EE holds the workpiece W again and the attitude of the workpiece W is changed before the three-dimensional measurement and the temperature correction are performed.

After the three-dimensional measurement is terminated, the robot arm apparatus 500 conveys the workpiece W that has been subjected to the measurement out of the three-dimensional measuring machine 3 (step S34). When there is another workpiece W to be measured (Yes in step S52), the process returns to step S10 and the same process is performed again on the new workpiece W.

When there is no other workpiece W to be measured (No in step S52), the process is terminated. Obviously, as with the fifth embodiment, an effect in which the attachment of the temperature detecting means 57 by human hand can be eliminated and an effect in which the temperature detection can be started at an early timing is attained according to the third modification of the fifth embodiment.

Furthermore, although the three-dimensional measurement is performed in the state in which the workpiece W is detached from the end effector EE according to the third modification of the fifth embodiment, even in this case, a temperature can be detected and the temperature determination can be performed in the state in which the workpiece W is held by the end effector EE before being detached from the end effector EE. Accordingly, since the workpiece W in this state that does not satisfy the temperature condition can be quickly conveyed, an operation rate of the three-dimensional measuring machine 3 can be improved.

Furthermore, step S51 and step S52 in FIG. 25 may be changed to step S40 to step S42 in FIG. 24. By this, in addition to the effects described above, the effects of the first modification of the fifth embodiment can be attained.

Note that, also in the modifications of the fifth embodiment, the robot base 53 disposed on the surface plate 18 may be used instead of the robot base 52 disposed outside the surface plate 18.

{Fourth Modification of Fifth Embodiment}

The arm vibration detecting means 55 and/or the surface-plate vibration detecting means 56 and the vibration correcting means 31 described in the third and fourth embodiments may be further added to the three-dimensional measuring system 5000 according to the fifth embodiment illustrated in FIG. 20.

According to the fourth modification of the fifth embodiment, a measured value of the three-dimensional measurement performed on the workpiece W can be corrected based on vibration of the robot arm 50 and/or the surface plate 18 and a temperature of the workpiece W, and therefore, accuracy of the three-dimensional measurement can be further improved.

{Others}

Furthermore, the measuring machine control apparatus 30, the vibration correcting means 31, the temperature correcting means 32, and the robot arm control apparatus 60 are realized by a general-purpose computer, such as a workpiece station or a personal computer, that includes a processor, such as a CPU (Central Processing Unit) or an FPGA (Field Programmable Gate Array), a memory, such as a ROM or a RAM, an external recording apparatus, such as a hard disk, an input apparatus, an output apparatus, and a network connection apparatus. The memory of the measuring machine control apparatus 30 stores a program used to operate the measuring machine body 10, and the measurement may be automatically performed when the processor reads and executes the program. Furthermore, the memory of the robot arm control apparatus 60 stores a program used to operate the robot arm 50, and the conveyance of the workpiece W and the change in the attitude of the workpiece W may be automatically performed when the processor reads and executes the program. Furthermore, the measuring machine control apparatus 30 and the robot arm control apparatus 60 may operate in cooperation with each other so that the entire measurement is automatically performed.

{Effects}

As described above, according to the three-dimensional measuring systems 1000, 2000, 3000, 4000, and 5000, the attitude of the workpiece W can be easily changed since the three-dimensional measurement is performed on the workpiece W while the workpiece W is held by the end effector EE. Accordingly, efficiency of the three-dimensional measurement can be improved.

In the three-dimensional measuring systems 1000, 4000, and 5000, the three-dimensional measurement is performed on the workpiece W in the state in which a portion of the robot arm 50 directly or indirectly abuts on the surface plate 18 of the three-dimensional measuring machine 1 while the workpiece W is held by the end effector EE. Accordingly, influence of the vibration of the robot arm 50 on the workpiece W can be reduced, and therefore, accuracy of the three-dimensional measurement can be improved.

In the robot arm apparatuses 200 and 300, since the robot base 53 is disposed on the surface plate 18, influence of the vibration in the outside environment on the workpiece W can be reduced and followability to the change in the attitude of the surface plate 18 can be ensured without causing a portion of the robot arm 50 to directly or indirectly abut on the surface plate 18. Accordingly, accuracy of the three-dimensional measurement can be further improved.

As described above, it is apparent that a portion of the robot arm 50 may be directly or indirectly brought into contact also in the three-dimensional measuring systems 2000 and 3000.

In the robot arm apparatuses 300 and 400, the arm vibration detecting means 55 and/or the surface-plate vibration detecting means 56 can detect vibration of the robot arm 50 and/or vibration of the surface plate 18, and the vibration correcting means 31 of the three-dimensional measuring machine 2 can correct a measured value of the three-dimensional measurement performed on the workpiece W based on the detected vibration. Accordingly, accuracy of the three-dimensional measurement can be further improved.

A temperature of the workpiece W held by the end effector EE can be detected by the temperature detecting means 57 of the robot arm apparatus 400, and a measured value of the three-dimensional measurement performed on the workpiece W can be corrected by the temperature correcting means 32 of the three-dimensional measuring machine 3 based on the detected temperature. Accordingly, a process of mounting a sensor for detecting a temperature of the workpiece W used by the user on the robot arm 50 or the like may be omitted. Furthermore, since the temperature measurement can be performed on the workpiece W before the workpiece W is conveyed and disposed in the measuring position, efficiency of the three-dimensional measurement can be further improved. In addition, accuracy of the three-dimensional measurement can be further improved since the temperature correction is performed.

When the components included in the robot arm apparatuses 100, 200, 300, and 400 and the three-dimensional measuring machines 1, 2, and 3 are arbitrarily combined with each other, a desired one of the effects described above can be appropriately obtained.

Although the examples of the presently disclosed subject matter have been described hereinabove, the presently disclosed subject matter is not limited to the embodiments described above, and it is apparent that various modifications can be made without departing from the scope of the presently disclosed subject matter.

REFERENCE SIGNS LIST 1, 2, 3: Three-dimensional measuring machine
10: Measuring machine body
12: Head
14: Beam
16: Column
18: Surface plate
20: Base
22: Probe
24: Stylus
26: Gauge head
30: Measuring machine control apparatus
31: Vibration correcting means
32: Temperature correcting means
40: Controller
50: Robot arm
52, 53: Robot base
52a: Tip end portion
55: Arm vibration detecting means
56: Surface-plate vibration detecting means
57: Temperature detecting means
60: Robot arm control apparatus
71, 75: Base portion
72: Claw portion
73, 77: Holding surface
76: Chuck
100, 200, 300, 400, 500: Robot arm apparatus
1000, 2000, 3000, 4000, 5000: Three-dimensional measuring system
A1: First arm
A2: Second arm
A3: Third arm
B: Block
EE: End effector
J1: First joint portion
J2: Second joint portion
J3: Third joint portion
J4: Fourth joint portion
L1: Center axis of workpiece
W: Workpiece

What is claimed is:

1. A three-dimensional measuring system comprising:
   a surface plate;
   a robot arm configured to hold a workpiece to be measured and change an attitude of the workpiece;
   a probe configured to be movable relative to the surface plate and perform three-dimensional measurement on the workpiece;
   relative-position change detector including a laser tracker that detects a change in a relative position between the surface plate and the robot arm; and
   a processor configured to correct a result of the measurement performed on the workpiece by the probe based on a result of detection performed by the relative-position change detector.

2. The three-dimensional measuring system according to claim 1, wherein
   the probe performs the three-dimensional measurement on the workpiece in a state in which the workpiece is held by the robot arm.

3. The three-dimensional measuring system according to claim 1, wherein
   the relative-position change detector includes an arm vibration detector including a sensor or a laser tracker that detects vibration of the robot arm.

4. The three-dimensional measuring system according to claim 3, wherein
   the arm vibration detector detects vibration in the vicinity of a tip end portion of the robot arm.

5. The three-dimensional measuring system according to claim 1, wherein
   the relative-position change detector includes surface-plate vibration detector including a sensor or a laser tracker that detects vibration of the surface plate.

6. The three-dimensional measuring system according to claim 1, wherein
   the relative-position change detector includes inclination detecting sensor for detecting an inclination of the surface plate relative to a horizontal direction.

7. The three-dimensional measuring system according to claim 1, wherein
   the relative-position change detector detects change amounts of a relative position in a horizontal direction and a vertical direction, and
   the processor is further configured to add the change amounts of the relative position to or subtract the change amounts of the relative position from a result of the measurement performed on the workpiece by the probe in the horizontal direction and the vertical direction.

8. The three-dimensional measuring system according to claim 1, wherein
   the relative-position change detector detects change in the relative position in real time, and
   the processor is further configured to correct a result of the measurement performed on the workpiece by the probe in real time based on the change in the relative position detected in real time.

9. The three-dimensional measuring system according to claim 1, wherein
   the laser tracker includes:
      a reflector, and
      a laser tracker body configured to emit laser light to the reflector and receive reflected light of the laser light from the reflector so as to obtain a displacement of the reflector, and
   the reflector is disposed on the robot arm.

10. The three-dimensional measuring system according to claim 1, further comprising:
    a temperature detecting sensor for detecting a temperature of the workpiece; and
    the processor is further configured to correct the result of the measurement performed on the workpiece by the probe based on a result of detection performed by the temperature detecting sensor.

11. The three-dimensional measuring system according to claim 1, wherein
    an end effector of the robot arm includes temperature detecting sensor for detecting a temperature of the workpiece.

12. The three-dimensional measuring system according to claim 11, wherein
    the temperature detecting sensor is disposed on a holding surface of the end effector that holds the workpiece.

13. The three-dimensional measuring system according to claim 11, wherein
    the processor is further configured to correct the result of the measurement performed on the workpiece by the probe based on a result of detection performed by the temperature detecting sensor.

14. The three-dimensional measuring system according to claim 10, wherein
    the temperature detecting sensor detects a temperature of the workpiece in a state in which the workpiece is held by the robot arm.

15. The three-dimensional measuring system according to claim 14, wherein
    the temperature detecting sensor starts detection of a temperature of the workpiece when the workpiece is held by the robot arm.

16. The three-dimensional measuring system according to claim 1, wherein
    a robot base that supports the robot arm is disposed outside the surface plate.

17. The three-dimensional measuring system according to claim 1, wherein
    a robot base that supports the robot arm is disposed on the surface plate.

18. The three-dimensional measuring system according to claim 1, wherein
    the robot arm includes an abutting portion that directly or indirectly abuts on the surface plate when the probe measures the workpiece.

19. The three-dimensional measuring system according to claim 18, wherein
    a damping member is disposed on the surface plate, and
    the abutting portion of the robot arm indirectly abuts on the surface plate through the damping member.

20. The three-dimensional measuring system according to claim 18, wherein
    the robot arm includes a plurality of arms and a plurality of joint portions coupling the plurality of arms with one another in a rotatable manner, and
    the abutting portion of the robot arm is one of the plurality of joint portions.

21. The three-dimensional measuring system according to claim 20, wherein
    the abutting portion of the robot arm is one of the plurality of joint portions that is closest to the end effector.

22. A three-dimensional measuring method, comprising:
    a conveying step of conveying a workpiece to be measured by a robot arm configured to change an attitude of the workpiece;

a measuring step of performing three-dimensional measurement on the workpiece by a probe configured to be movable relative to a surface plate in a state in which the workpiece is held by the robot arm;
a relative-position change detecting step of detecting a change in a relative position between the surface plate and the robot arm; and
a vibration correcting step of correcting a result of the measurement performed on the workpiece in the measuring step based on a result of detection performed in the relative-position change detecting step.

23. The three-dimensional measuring method according to claim 22, wherein
in the measuring step, the probe performs the three-dimensional measurement on the workpiece in a state in which the workpiece is held by the robot arm.

24. The three-dimensional measuring method according to claim 22, wherein
the relative-position change detecting step includes a step of detecting vibration of the robot arm.

25. The three-dimensional measuring method according to claim 22, wherein
the relative-position change detecting step includes a step of detecting vibration of the surface plate.

26. The three-dimensional measuring method according to claim 22, wherein
the relative-position change detecting step includes a step of detecting an inclination of the surface plate relative to a horizontal direction.

27. The three-dimensional measuring method according to claim 22, wherein
the relative-position change detecting step includes a step of detecting change amounts of the relative position in a horizontal direction and a vertical direction, and
the vibration correcting step includes a step of adding the change amounts of the relative position to or subtracting the change amounts of the relative position from a result of the measurement performed on the workpiece by the probe in the horizontal direction and the vertical direction.

28. The three-dimensional measuring method according to claim 22, wherein
the relative-position change detecting step detects change in the relative position in real time, and
the vibration correcting step corrects the result of the measurement performed on the workpiece by the probe in real time based on the change in the relative position detected in real time.

29. The three-dimensional measuring method according to claim 22, further comprising
a temperature detecting step of detecting a temperature of the workpiece by a temperature detecting sensor disposed on an end effector of the robot arm.

30. The three-dimensional measuring method according to claim 29, further comprising
a temperature correcting step of correcting the result of the measurement performed on the workpiece in the measuring step based on a result of detection performed in the temperature detecting step.

31. The three-dimensional measuring method according to claim 22, further comprising:
a temperature detecting step of detecting a temperature of the workpiece; and
a temperature correcting step of correcting the result of the measurement performed on the workpiece in the measuring step based on a result of detection performed in the temperature detecting step.

32. The three-dimensional measuring method according to claim 30, wherein
the temperature detecting step is performed in real time in a state in which the workpiece is held by the robot arm, and
in the temperature correcting step, the result of the measurement performed on the workpiece in the measuring step is corrected in real time based on a result of the detection performed in the temperature detecting step.

33. The three-dimensional measuring method according to claim 29, wherein
the temperature detecting step is included in the conveying step.

34. The three-dimensional measuring method according to claim 29, wherein
the temperature detecting step is performed in a state in which the workpiece is held by the robot arm.

35. The three-dimensional measuring method according to claim 34, wherein
the temperature detecting step is started when the workpiece is held by the robot arm.

36. The three-dimensional measuring method according to claim 29, further comprising:
a temperature determining step of determining whether the temperature of the workpiece satisfies a predetermined temperature condition.

37. The three-dimensional measuring method according to claim 36, wherein
the temperature determining step is performed in a state in which the workpiece is held by the robot arm.

38. The three-dimensional measuring method according to claim 37, wherein
when it is determined that the predetermined temperature condition is not satisfied in the temperature determining step, the workpiece is conveyed while being held by the robot arm.

39. The three-dimensional measuring method according to claim 22, wherein
a robot base that supports the robot arm is disposed outside the surface plate.

40. The three-dimensional measuring method according to claim 22, wherein
a robot base that supports the robot arm is disposed on the surface plate.

41. The three-dimensional measuring method according to claim 22, further comprising
a mounting step of causing an abutting portion of the robot arm to directly or indirectly abut on the surface plate in a state in which the workpiece is held by the robot arm.

42. The three-dimensional measuring method according to claim 41, wherein
damping member is disposed on the surface plate, and
in the mounting step, the abutting portion of the robot arm indirectly abuts on the surface plate through the damping member.

43. The three-dimensional measuring method according to claim 41, wherein
the robot arm includes a plurality of arms and a plurality of joint portions coupling the plurality of arms to one another in a rotatable manner, and
the abutting portion of the robot arm is one of the plurality of joint portions.

44. The three-dimensional measuring method according to claim 43, wherein the abutting portion of the robot arm is one of the plurality of joint portions that is positioned closest to the end effector.

\* \* \* \* \*